(12) United States Patent
Tajima

(10) Patent No.: US 6,831,708 B2
(45) Date of Patent: Dec. 14, 2004

(54) IMAGE DISPLAY APPARATUS

(75) Inventor: Hisao Tajima, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 517 days.

(21) Appl. No.: 09/902,569

(22) Filed: Jul. 12, 2001

(65) Prior Publication Data

US 2002/0008790 A1 Jan. 24, 2002

(30) Foreign Application Priority Data

Jul. 19, 2000 (JP) .................................... 2000-219564
Jul. 2, 2001 (JP) .................................... 2001-200785

(51) Int. Cl.⁷ ............................................ H07L 29/06
(52) U.S. Cl. .......................... 349/11; 349/2; 349/5; 349/7; 349/17; 349/58; 361/681; 361/604; 361/685; 361/686; 361/687; 361/688
(58) Field of Search ........................ 349/2, 5, 7, 11, 349/17, 58; 361/681, 684, 685, 686, 687, 688

(56) References Cited

U.S. PATENT DOCUMENTS 5,675,426 A * 10/1997 Meisner et al. ............. 348/838
5,978,215 A * 11/1999 Chiu et al. .................. 361/687
6,307,745 B1 * 10/2001 Liebenow ................... 361/686
6,466,278 B1 * 10/2002 Harrison et al. ............ 348/836
6,477,039 B2 * 11/2002 Tajima ....................... 361/681
2003/0214498 A1 * 11/2003 Gothard ..................... 345/204

FOREIGN PATENT DOCUMENTS

| JP | 7-248850 | 9/1995 |
| JP | 9-179660 | 7/1997 |
| JP | 10-125050 | 5/1998 |
| JP | 10-144065 | 5/1998 |
| JP | 10-222246 | 8/1998 |
| JP | 11-190978 | 7/1999 |

* cited by examiner

Primary Examiner—Allan R. Wilson
Assistant Examiner—Edgardo Ortiz
(74) Attorney, Agent, or Firm—Fitzpatrick, Cella, Harper & Scinto

(57) ABSTRACT

As a structure capable of housing a recording/reproducing unit within a thin type image display apparatus without damaging the characteristic of the thin-type image display apparatus such as a wall-hung TV when using the unit, there is provided an image display apparatus having a flat display panel and a casing that supports the display panel wherein a recording/reproducing unit that houses a storage medium therein and conducts the writing or reading with respect to the storage medium is supported substantially in parallel with the display panel within the casing. The image display apparatus is capable of changing the arrangement direction of the storage medium, suppressing an interference of the storage medium with a peripheral device at the time of projecting the storage medium, and housing the storage medium so as not to be superimposed on the display panel.

29 Claims, 12 Drawing Sheets

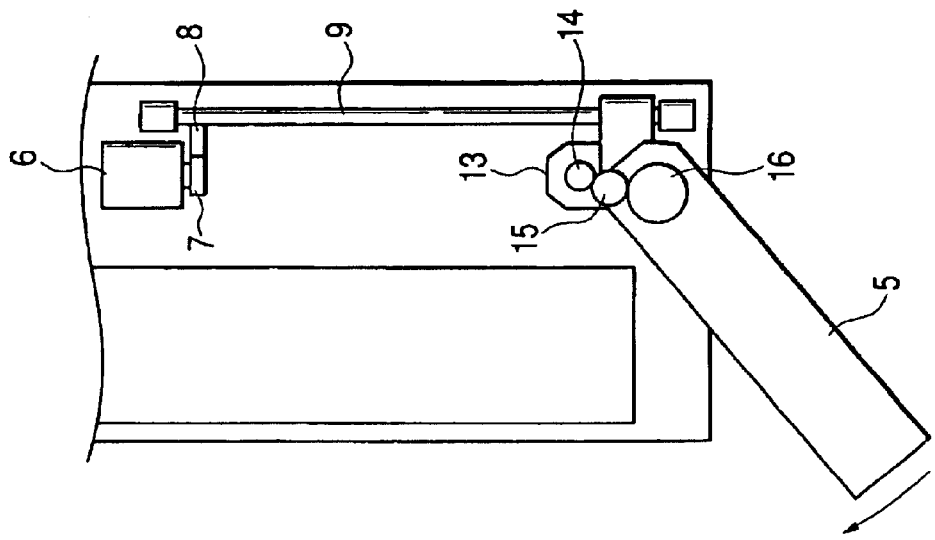
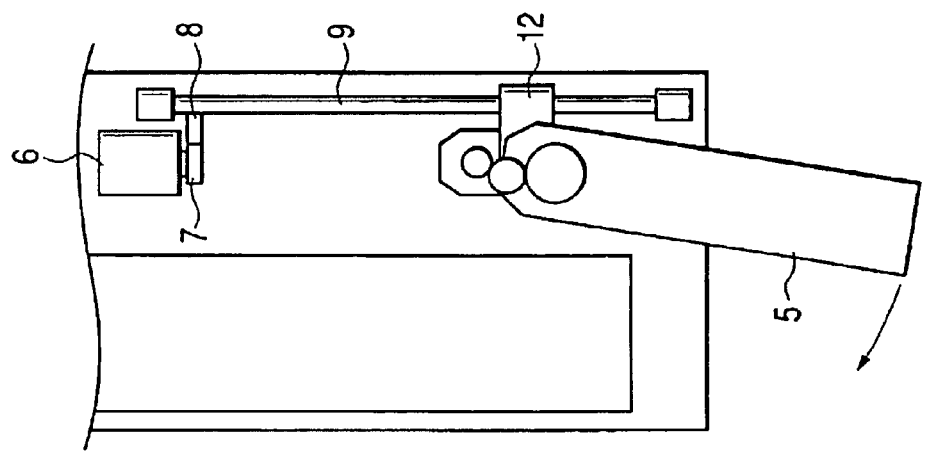
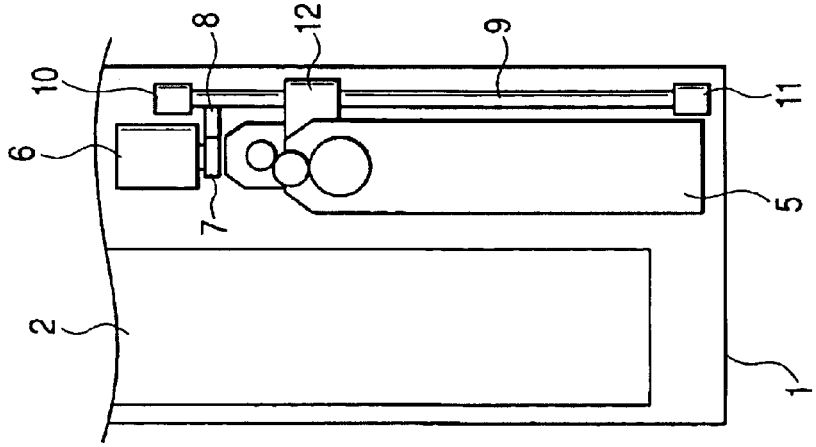

IMAGE DISPLAY APPARATUS

BACKGROUND OF THE INVENTION

1. Field of the Invention

The present invention relates to an image display apparatus including therein a recording/reproducing unit that reproduces information pertaining to an image, a music or an audio which is stored in a recording medium such as a CD-ROM or a DVD which is equipped in the recording/reproducing unit, or a recording/producing unit that writes the information in the recording medium.

2. Related Background Art

A thin-type flat image display apparatus such as a display apparatus using an electron-emitting device, a display apparatus using plasma discharge, a display apparatus using liquid crystal or a display apparatus using a vacuum fluorescent display are used in a television, a terminal of a computer, an advertising medium or an indicator. In addition, attention has been recently paid to a wall-hung TV of 40 inches or more in screen size, which utilizes the characteristic of a thin type image display apparatus. The basic structure of the image display apparatus includes an image display unit, an electric circuit unit, a structure section that supports the image display unit and the electric circuit unit, a speaker unit and so on.

In recent years, an input source for playing audio and video with such an image display apparatus is now changing from an analog signal to a digital signal, with which various input/output devices for image signals have been spread. In particular, a device that can record and reproduce a video signal is now changing from a device such as a conventional video tape recorder which uses a tape as a recording medium to a device such as a digital video disc (DVD) which uses a disc as a recording medium.

FIG. 14 is a diagram showing the appearance of a conventional image display apparatus 100 that includes a recording/reproducing unit therein.

In the figure, reference numeral 100 denotes a main body of the image display apparatus which houses a CRT module for image display, a recording/reproducing unit, an electric circuit and so on therein. Reference numeral 101 denotes a display screen of the CRT, and 102 is a storage medium projecting from the main body 100. The storage medium 102 utilizes, for example, an optical disc medium, and the operation of taking in/out the optical disc with respect to the main body is conducted by projecting the storage medium 102 from the main body 100. Also, when the image or the like stored in the recording medium is reproduced, the storage medium 102 is received in the main body 100 and then operates. Conventionally, the storage medium 102 is disposed at a facade of the main body which is the same side as that of the display screen 101 taking the operability by the user into consideration. Also, in recent years, attention has been paid to a display apparatus using plasma discharge as a thin type wall-hung TV.

FIG. 15 is a diagram showing the appearance of an example in which a recording/reproducing device 114 is connected externally to a thin type wall-hung TV.

In the figure, reference numeral 110 denotes a thin type wall-hung TV, and 111 is an image display unit using, for example, plasma discharge. Reference numeral 112 denotes a left speaker, and 113 is a right speaker. Reference numeral 114 is a recording/reproducing device, and 115 is a storage medium using an optical disc medium. Reference numeral 116 denotes a power cable of the recording/reproducing device 114, and 117 is a signal cable that connects the wall-hung TV 110 and the recording/reproducing device 114.

Japanese Patent Application Laid-open No. 11-190978 discloses a liquid crystal display monitor in which a magnetic disc drive device and an optical disc drive device are disposed on a back side of the liquid crystal display monitor, and a disc ejection outlet is disposed at a side surface of a casing.

Also, Japanese Patent Application Laid-open No. 9-179660 discloses a computer in which a CD-ROM device is installed in a unit having a screen display unit.

Further, Japanese Patent Application Laid-open No. 10-222246 discloses a structure in which a disc device is disposed at a side of a casing having a display apparatus in which the display apparatus is not disposed in an information processing device.

Further, Japanese Patent Application Laid-open No. 7-248850 discloses an electronic calculator having an input/output device that detachably holds a storage medium at a cap portion having a flat display.

In addition, Japanese Patent Application Laid-open No. 10-144065 discloses a laptop computer including an LCD, an HDD and an FDD at a cap portion.

Further, Japanese Patent Application Laid-open No. 10-125050 discloses a portable personal computer structured in such a manner that a recording medium drive device is disposed under a keyboard, and a direction that faces a recording medium insert/extract slot and so on is changed at the time of extracting the drive device and further its position can be held in a horizontal state or a vertical state.

As shown in FIG. 14, in the image display apparatus in which a storage medium 102 is inserted into a main body 1 to conduct recording/reproducing operation, there is no need to provide a cable wiring for connecting an image display apparatus 100 and a recording/reproducing device that reads or stores data from the storage medium 102, thus to supply power to the recording/reproducing device. Therefore the appearance is simple, which allows excellent operability by the user. However, the structure of this type must be improved as follows:

(1) The depth dimension of the image display apparatus 100 (D1 in the figure) becomes larger with an increased screen size, and therefore it is difficult to locate the image display apparatus in a small room. For example, if the size of the screen 101 is 36 inches, its depth becomes about 60 (cm). This is caused by the structure of a CRT used in the image display unit 101.

On the other hand, in the case of connecting a conventional thin-type wall-hung TV and an external recording/reproducing device as shown in FIG. 15, though the wall-hung TV is space-efficient (in the figure, the dimension of D3 is about 80 [mm] to 100 [mm]), a space in which the recording/reproducing device 114 is located is additionally required. Also, there arises such a problem that the cable 117 that connects the wall-hung TV 110 and the recording/reproducing device 114 is exposed from a wall surface, which can be unsightly.

This problem can be solved by equipping the recording/reproducing device 114 in the thin type wall-hung TV 110. In the image display apparatus using a CRT with a deeper depth as shown in FIG. 14, the depth of the storage medium 115 (D2 in the figure) is well within the depth (D1) of the entire device 100, but in the thin-type display apparatus such as the wall-hung TV, the depth dimension (D3) of the entire apparatus becomes smaller than the dept (D2) of the storage medium 115, resulting in such a problem that the integration is difficult. Also, even in the case where the depth dimension of the entire apparatus is larger than the depth of the storage medium, a mechanism for writing or reading data with respect to the storage medium is required, and thus the integration is still difficult.

SUMMARY OF THE INVENTION

The present invention has been made in view of the above conventional examples, and therefore an object of the present invention is to provide an image display apparatus which is capable of housing a recording/reproducing unit in the apparatus without damaging the characteristics of a thin type image display apparatus such as a wall-hung TV.

Another object of the present invention is to realize a structure for making the handling of the storage medium easy in a case where a structure is adopted such that a storage medium is contained in the image display apparatus, and to improve the degree of freedom in locating a peripheral device.

In order to achieve the above objects, according to the present invention, there is provided an image display apparatus having a flat type image display panel and a casing that supports the image display panel, the image display apparatus comprising:

a recording/reproducing unit that conducts writing or reading with respect to a plate like storage medium; and a transport structure that supports the storage medium substantially in parallel with a panel face of the image display panel within the casing and projects the storage medium from the casing;

characterized in that the transport structure changes an arrangement direction of the storage medium, such that the arrangement direction of the storage medium supported by the casing and the arrangement direction of the storage medium projected from the casing are different.

In the present invention, since the direction of the storage medium can be changed, the handing of the storage medium at the time of projection, for example, can be facilitated. For example, the direction of the storage medium at the time of projection is set to a direction where a normal of the widest area of the storage medium becomes non-horizontal, thereby being capable of easily handling the storage medium. In particular, in the structure in which the storage medium is projected downward, the direction of the storage medium at the time of projection is set to the direction where the normal of the widest area of the storage medium becomes non-horizontal, thereby being capable of easily handling the storage medium.

In the present invention, it is preferable that the transport structure is of a structure in which a period of time during which the direction of the storage medium gradually changes occurs while the storage medium is shifted from a state where the storage medium is received in the casing to a state where the storage medium is most projected from the casing.

Also, according to the present invention, there is provided an image display apparatus having a flat type image display panel and a casing that supports the image display panel, the image display apparatus comprising:

a recording/reproducing unit that conducts writing or reading with respect to a plate-like storage medium; a transport structure that supports the storage medium substantially in parallel with a panel face of the image display panel within the casing and projects the storage medium from the casing; and a moving structure for relatively moving a peripheral device attached to the casing with respect to the casing;

characterized in that the moving structure can relatively move the peripheral device positioned at a position where the peripheral device interferes with the storage medium when the storage medium is projected from the casing to a position where the peripheral device does not interfere with the projection of the storage medium.

With the above structure, the degree of freedom of the position to which the peripheral device is attached can be increased.

As the peripheral device, there is a speaker. In addition to the case of a speaker, the present invention is applicable to, for example, a case in which a camera is attached as the peripheral device, and a case where a stand or a wall-hung member for locating the image display apparatus as the peripheral device is attached to the casing. In the case of relatively moving the member for locating the image display apparatus and the casing, a structure may be adopted such that the casing is moved instead of moving the position of the member for locating the image display apparatus.

Also, in the present invention, it is preferable that the moving structure is of the structure in which the peripheral device and the casing can be relatively moved so that they can be apart from each other, or of the structure in which a position for mounting the peripheral device to the casing is movable.

Further, according to the present invention, there is provided an image display apparatus having a flat type image display panel and a casing that supports the image display panel, the image display apparatus comprising:

a recording/reproducing unit that conducts writing or reading with respect to a plate-like storage medium; and a transport structure that supports the storage medium substantially in parallel with a panel face of the image display panel within the casing and at a position where the storage medium is not superimposed on the image display panel, and projects the storage medium from the casing.

In particular, in the present invention, it is preferable that the transport structure is such that a holding structure for holding the recording/reproducing unit or the storage medium is drawn toward a front side while changing the direction of the storage medium, to thereby project from the casing. Also, in particular, it is preferable that the recording/reproducing unit and the holding structure are rotated with a rotating shaft which is substantially in parallel with the panel surface as a center and are drawn toward the front side, to thereby project the storage medium (together with the recording/reproducing unit and the holding structure).

In the respective inventions described above, it is preferable that the plate-like storage medium is formed of a disc like storage medium.

Also, in the respective inventions described above, it is preferable that the projection of the storage medium is conducted for the each recording/reproducing unit. Also, in the case of providing a holding structure (for example, a disc tray) which holds the storage medium in the interior of the recording/reproducing unit, the storage medium may be projected for the each holding structure. Further, only the storage medium may be projected.

In the respective inventions described above, when the image display panel has a large screen, in particular, a display screen of 30 inches or more in a diagonal line, more preferably a display screen of 40 inches or more in the diagonal line, the present invention can be preferably applied.

Still further, in the respective inventions described above, a structure where the image display panel is a display panel in which 100 or more electron-emitting devices of are arranged, a structure in which the image display panel is a plasma display panel, and a structure in which the image display panel is a liquid crystal panel can be preferably adopted.

Still further, according to the present invention, there is provided an image display apparatus having a flat type image display panel and a casing that supports the image display panel, the image display apparatus comprising:
   a support means for supporting a recording/reproducing unit with a predetermined thickness which houses a storage medium therein and conducts writing or reading with respect to the storage medium in a position where the recording/reproducing unit is substantially in parallel with the panel face of the image display panel in a thickwise direction of the recording/reproducing unit within the casing; and
   a control means for controlling the support means so as to project the recording/reproducing unit from the casing and to house the recording/reproducing unit within the casing or integrally with the casing.

Yet still further, according to the present invention, there is provided a method of receiving/extracting a recording/reproducing unit in an image display apparatus. That is, there is provided a method of receiving/extracting a recording/reproducing unit in an image display apparatus having a flat type image display panel, a recording/reproducing unit that receives a storage medium therein and conducts the writing/reading with respect to the storage medium, and a casing that supports the image display panel, characterized in that:
   the recording/reproducing unit is supported such that a panel face of the image display panel becomes substantially in parallel with the widest plane of the recording/reproducing unit;
   the recording/reproducing unit is externally projected from a lower portion of the casing and then the recording/reproducing unit is inclined when extracting the recording/reproducing unit; and
   the recording/reproducing unit is inclined within the casing, and while changing an angle of inclination in accordance with the elevation the recording/reproducing unit is elevated toward the direction of a housing position at the time of housing.

Yet still further, according to the present invention, there is provided a method of receiving/extracting a recording/reproducing unit in an image display apparatus. That is, there is provided a method of receiving/extracting a recording/reproducing unit in an image display apparatus having a flat type image display panel, a recording/reproducing unit that receives a storage medium therein and conducts the writing/reading with respect to the storage medium, and a casing that supports the image display panel, characterized in that:
   the recording/reproducing unit is supported such that a panel face of the image display panel becomes substantially in parallel with the widest plane of the recording/reproducing unit;
   the recording/reproducing unit is externally projected from a side of the casing when extracting the recording/reproducing unit; and
   the recording/reproducing unit is moved toward an opposite direction to a direction at the time of the extracting.

BRIEF DESCRIPTION OF THE DRAWINGS

FIGS. 2A, 2B and 2C are longitudinal cross-sectional views showing the main portion of the image display apparatus in accordance with the first embodiment of the present invention;

DETAILED DESCRIPTION OF THE PREFERRED EMBODIMENTS

Now, a description will be given in more detail of preferred embodiments of the present invention with reference to the accompanying drawings.

(First Embodiment)

Figure 1:
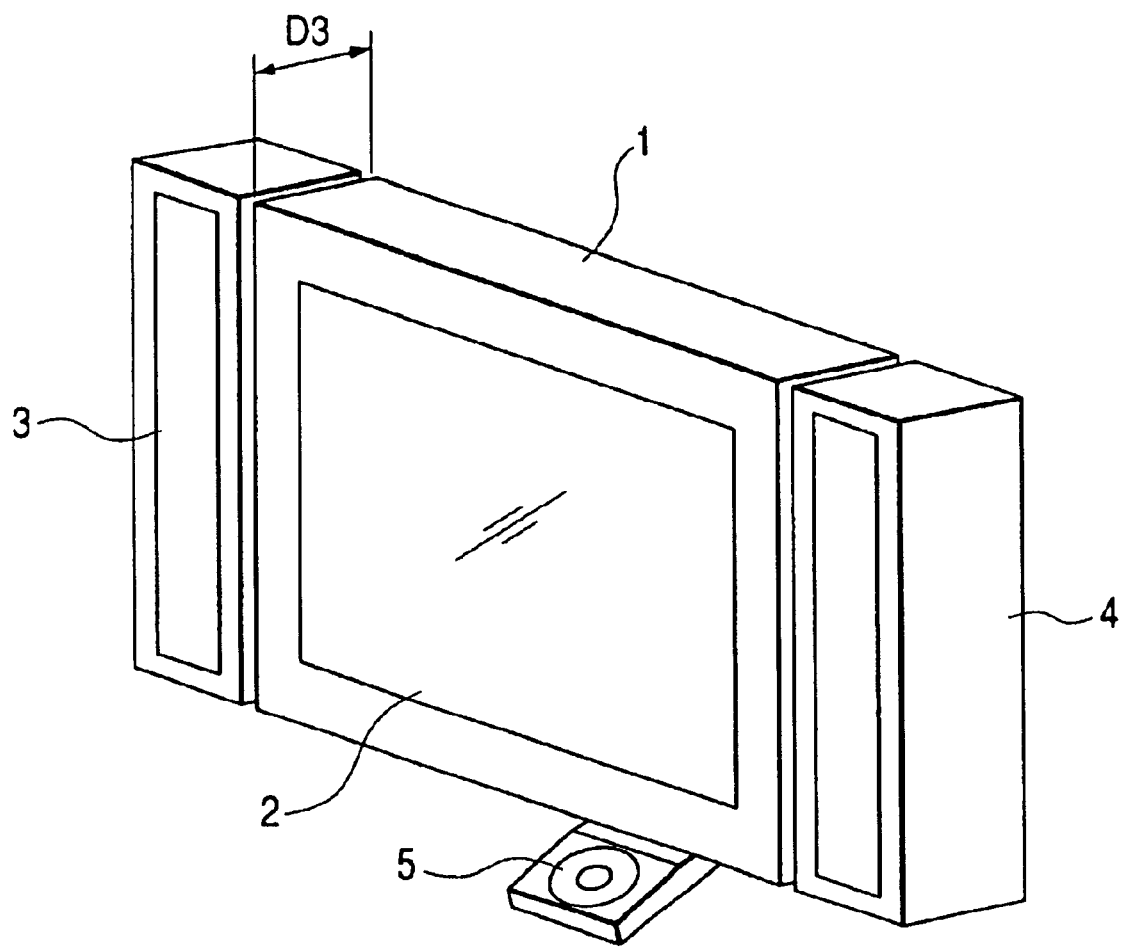
FIG. 1 is a diagram showing the appearance of an image display apparatus in accordance with a first embodiment of the present invention.

FIG. 1 is a diagram showing the appearance of an image display apparatus in accordance with a first embodiment of the present invention.

Referring to FIG. 1, reference numeral 1 denotes an image display apparatus having an image display panel using an electron-emitting device in accordance with this embodiment therein; 2 is an image display unit of the image display apparatus 1; 3 is a left speaker unit; 4 is a right speaker unit; and 5 is a recording/reproducing unit that outputs a reproduced image signal to the image display unit 2. In this embodiment, as the image display panel, there is used a panel in which surface conductive emission devices are arranged by 480 in a longitudinal direction and 640×3 (640 sets of three devices corresponding to the respective colors of red, blue and green) in a lateral direction in a matrix, and the diagonal of the display screen is 30 inches. Hereinafter, this panel is referred to as "SED".

FIGS. 2A to 2C are a longitudinal cross-sectional views showing the main portion best representing the features of the first embodiment of the present invention, and a diagram for explaining the arrangement of the image display unit 2 and the recording/reproducing unit 5 which are housed in the interior of the image display apparatus 1.

In this example, a description will be given of a method of manufacturing the image display unit 2 of a thin type flat image display apparatus, a basic structure and the operation principle in accordance with this embodiment.

The image display unit 2 uses electron-emitting devices. In the operation principle of the SED, a vacuum gap is formed between a rear plate (RP) at a back side and a face plate (FP) at a face side, and the electron-emitting devices are arranged on the rear plate (RP) in correspondence with the positions of the respective display pixels. The respective electron-emitting devices are formed in such a manner that plus electrodes and minus electrodes corresponding to the respective devices are opposed to each other at intervals of several tens [$\mu$m], and then after an x-directional wiring for guiding an electric signal from an electric circuit outside the vacuum gap to a plus electrode is formed through a printing method, an interlayer insulating layer for electrically insulating the y-directional wirings and x-directional wirings is formed at each of the cross portions of the y-directional wirings and the x-directional wirings on the x-directional wiring. Thereafter, y-axial wirings for guiding an electric signal from the electric circuit outside the vacuum gap to the minus electrode are formed through the printing method. In addition, an electroconductive thin film made of micro grains is formed between the plus electrode and the minus electrode corresponding to each of the devices, and potentials are given to the plus electrode and the minus electrode to form an electron-emitting region on a part of the electroconductive thin film (energization forming).

On the other hand, at the face plate (FP) side are formed a black stripe film for improving the contrast, phosphor films for each hue of three primary colors R, G and B, and further an electroconductive metal back film on the phosphor films, and each of the phosphors emit a light due to the collision of electrons emitted from the electron-emitting devices to display a color image.

In the operation of the electron-emitting devices, a voltage of ten-plus [v] is applied between the x-directional wiring and the y-directional wiring which are selected by the electric circuit to emit the electrons from the corresponding electron-emitting devices. The emitted electrons are accelerated by the plus potential of ten-plus [kv] applied from an external high voltage supply to the metal back film at the vacuum gap side of the face plate and collide with the phosphor film to thereby emit a light.

The rear plate and the external electric circuit are connected to each other through a flexible cable, and the cable and the electric circuit are electrically and mechanically connected to each other through a connector, and electrode portions (wiring end portions) of the x-directional wirings and the y-directional wirings and the electric circuit are electrically connected to each other. Also, the metal back film of the face plate and the high voltage supply circuit are electrically and mechanically connected to each other through a high voltage cable and a high voltage connector.

Figure 3:
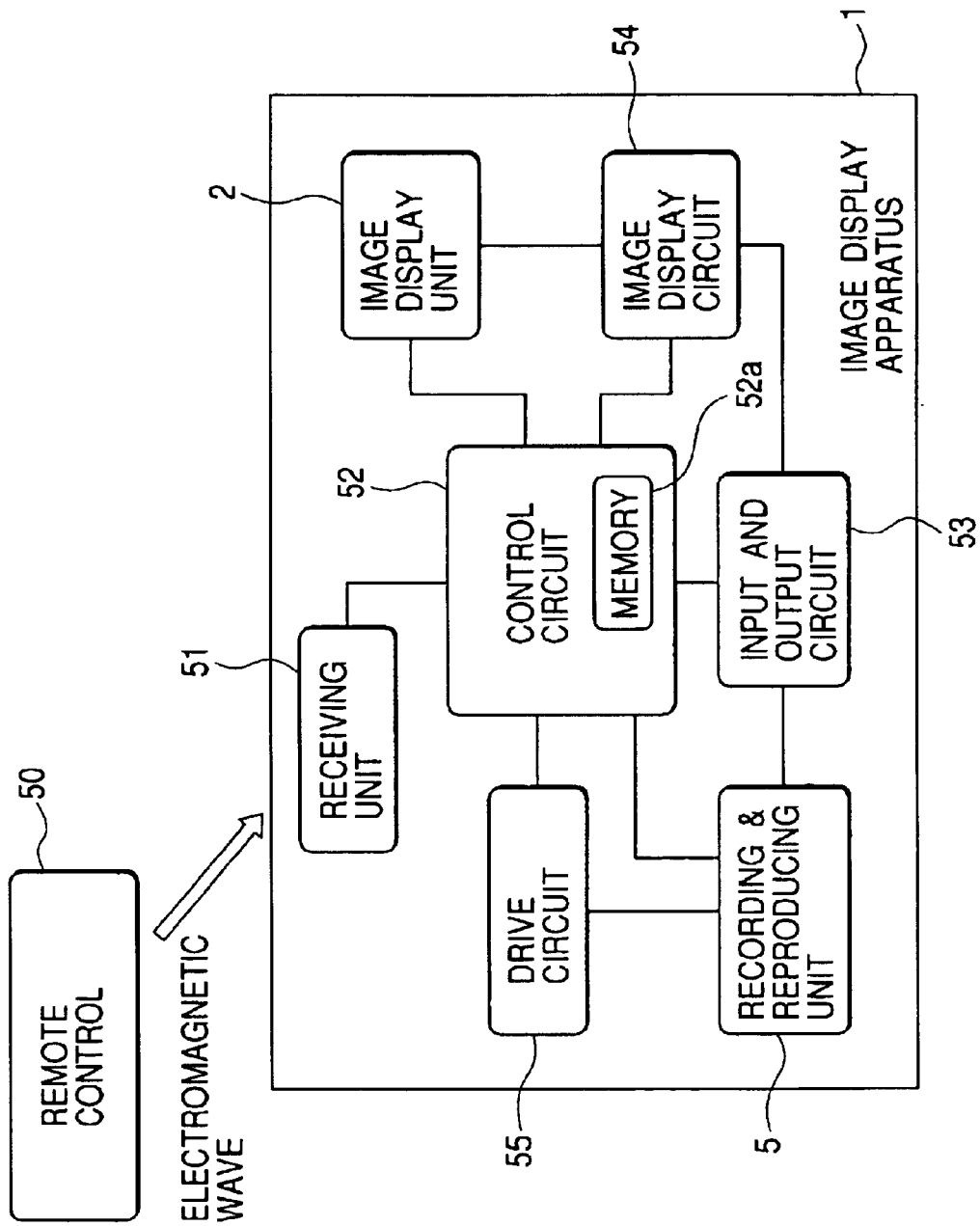
FIG. 3 is a block diagram showing the structure of the image display apparatus in accordance with the first embodiment of the present invention.

FIG. 2A is a diagram showing a state (close state) in which the recording/reproducing unit 5 is completely housed in the interior of the image display apparatus 1. In this state, the recording/reproducing unit 5 is housed therein in a state where the display screen of the display unit 2 and a front face of the recording/reproducing unit 5 (the widest surface) are substantially in parallel with each other in a thickwise direction of the recording/reproducing unit 5. FIG. 2B is a diagram showing a state in which the extraction of the recording/reproducing unit 5 is instructed and the recording/reproducing unit 5 starts to project from the image display apparatus 1. FIG. 2C shows a state in which the recording/reproducing unit 5 has been already projected from the image display apparatus 1 (a completely projected state: an open state). In addition, FIG. 3 is a block diagram showing the structure of the image display apparatus 1 in accordance with the first embodiment of the present invention (which is applicable to embodiments which will be described later). In FIGS. 2 and 3, the parts common to those in FIG. 1 are designated by identical reference numerals, and their description will be omitted.

Referring to FIGS. 2A to 2C, reference numerals 6 to 16 denote a transport structure. Reference numeral 6 denotes a up/down motor for moving up and down the recording/reproducing unit 5, which rotationally drives a rotary screw shaft 9 and moves up and down a female screw portion 12 engaged with the shaft 9 and fixed to the recording/reproducing unit 5 (having a screw meshed with a screw formed on the surface of the shaft 9). The up/down motor 6 is fixed to the interior of the image display apparatus 1, having a signal generating unit for generating an encoder signal in accordance with the amount of rotation, and the encoder signal is electrically connected to a control circuit 52 which will be described later. As a result, the control circuit 52 can grasp the amount of rotation of the motor 6. Reference numeral 7 denotes a gear which is fixed to the rotary shaft of the up/down motor 6. Reference numeral 8 denotes a reduction gear which is fixed to the interior of the image display apparatus 1 and is meshed with the gear 7 to reduce the rotating speed of the motor 6 and transmits the rotation to the shaft. The rotary screw shaft 9 is supported by an upper bearing 10 and a lower bearing 11 and is meshed with the reduction gear 8 so as to rotate. Each of the upper bearing 10 and the lower bearing 11 has a lubrication bearing built in, and the rotary screw shaft 9 is inserted into the upper and lower bearings 10 and 11 so as to rotatably support the shaft 9. The female screw portion 12 is meshed with the rotary screw shaft 9 and has a rotating mechanism (a motor 13, gears 14 to 16, etc.) of the recording/reproducing unit 5 which will be described later.

Referring to FIG. 2C, reference numeral 13 denotes a rotary drive motor which is fixed to the female screw portion 12 and has an encoder signal generating unit for detecting the amount of rotation of the rotary shaft of the motor 13, and an encoder signal outputted from the encoder signal generating unit is supplied to a control circuit 52. Reference numeral 14 denotes a gear fixed to the rotary shaft of the rotary drive motor 13, and 15 is a reduction gear fixed to the female screw portion 12 and meshed with the gear 14 for reducing the rotary speed. Reference numeral 16 denotes a rotary gear which is fixed to the side surface portion of the recording/reproducing unit 5, and its outer peripheral gear portion is meshed with the reduction gear 15 so as to rotate the recording/reproducing unit 5 as shown in FIGS. 2B and 2C.

Then, the functional structure of the image display apparatus 1 in accordance with the first embodiment will be described with reference to FIG. 3.

Referring to FIG. 3, reference numeral 50 denotes a remote control which is a remote control unit that gives various commands for effecting various functions in the image display apparatus in accordance with this embodiment. The remote control 50 includes a plurality of operation switches (not shown) manipulated by the operator, an electric circuit, an infrared ray originating unit and so on. Reference numeral 51 denotes a receiving unit for receiving an infrared ray which is built in the image display apparatus 1, and converts a signal from the remote control 50 which is received by the receiving unit 51 into an electric signal and then amplifies the electric signal. The receiving unit 51 also conducts the identification of a signal code and the like. Reference numeral 52 denotes a control circuit that generates a control signal for controlling all of the electronic circuit of the image display apparatus 1 and executes various controls. Reference numeral 53 denotes a signal input/output circuit that conducts the interface (not shown) of an external input signal and the exchange of an audio signal and a video signal with the recording/reproducing unit 5, and also has a function of converting a digital signal, etc. Reference numeral 54 denotes an image display circuit that converts the video signal from the signal input/output circuit 53 into a modulated signal or a scanning signal and outputs those signals to the image display unit 2 or the control circuit 52. Reference numeral 55 denotes a drive circuit that conducts the control of the up/down motor 6 and the rotary drive motor 13 which conduct the above-described housing and extracting operation of the recording/reproducing unit 5 in accordance with a command from the control circuit 52, and conducts processing of an encoder signal from the encoder signal generating unit disposed in each of the motors and the control of the operation current of each of the motors.

Subsequently, the structure of the recording/reproducing unit 5 in accordance with this embodiment will be described.

Figure 13A:
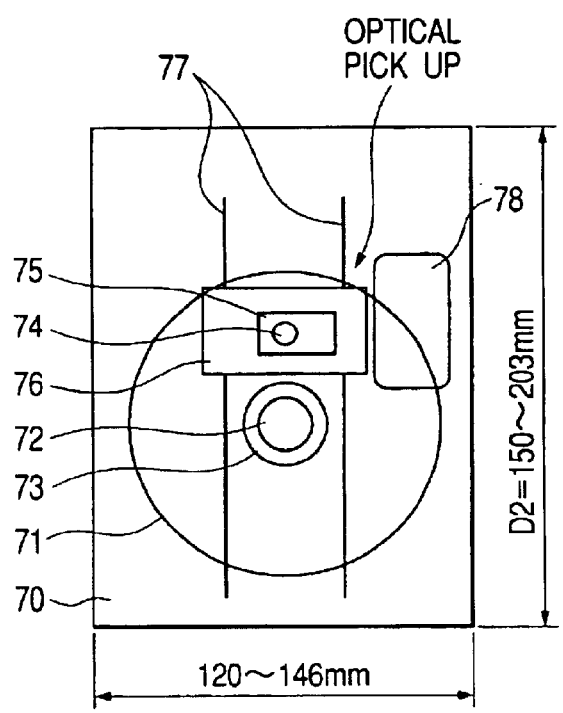
FIGS. 13A and 13B are diagrams showing the structure of a recording/reproducing unit in accordance with an embodiment of the present invention.
Figure 13B:
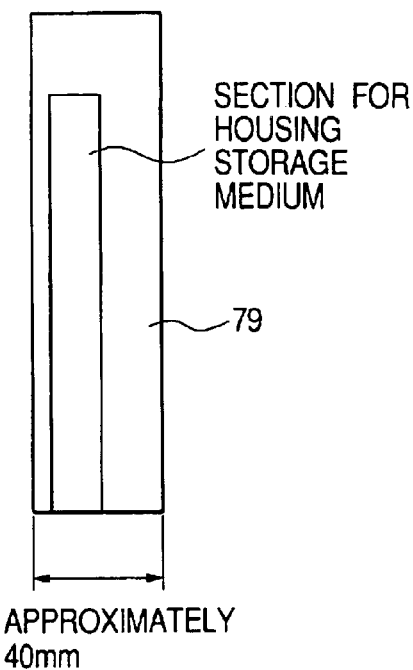
Figure 14:
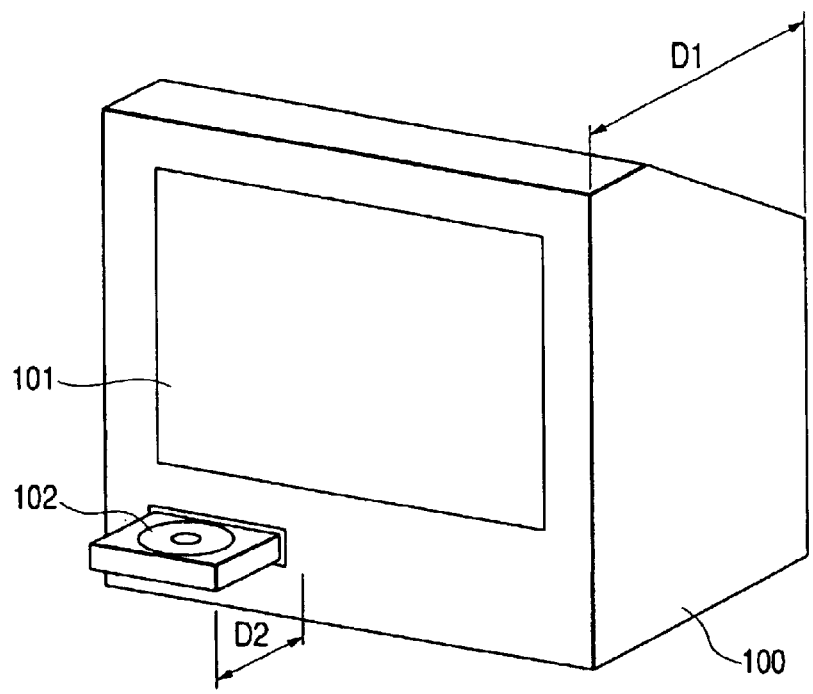
FIG. 14 is a diagram showing the appearance of a conventional image display apparatus.
Figure 15:
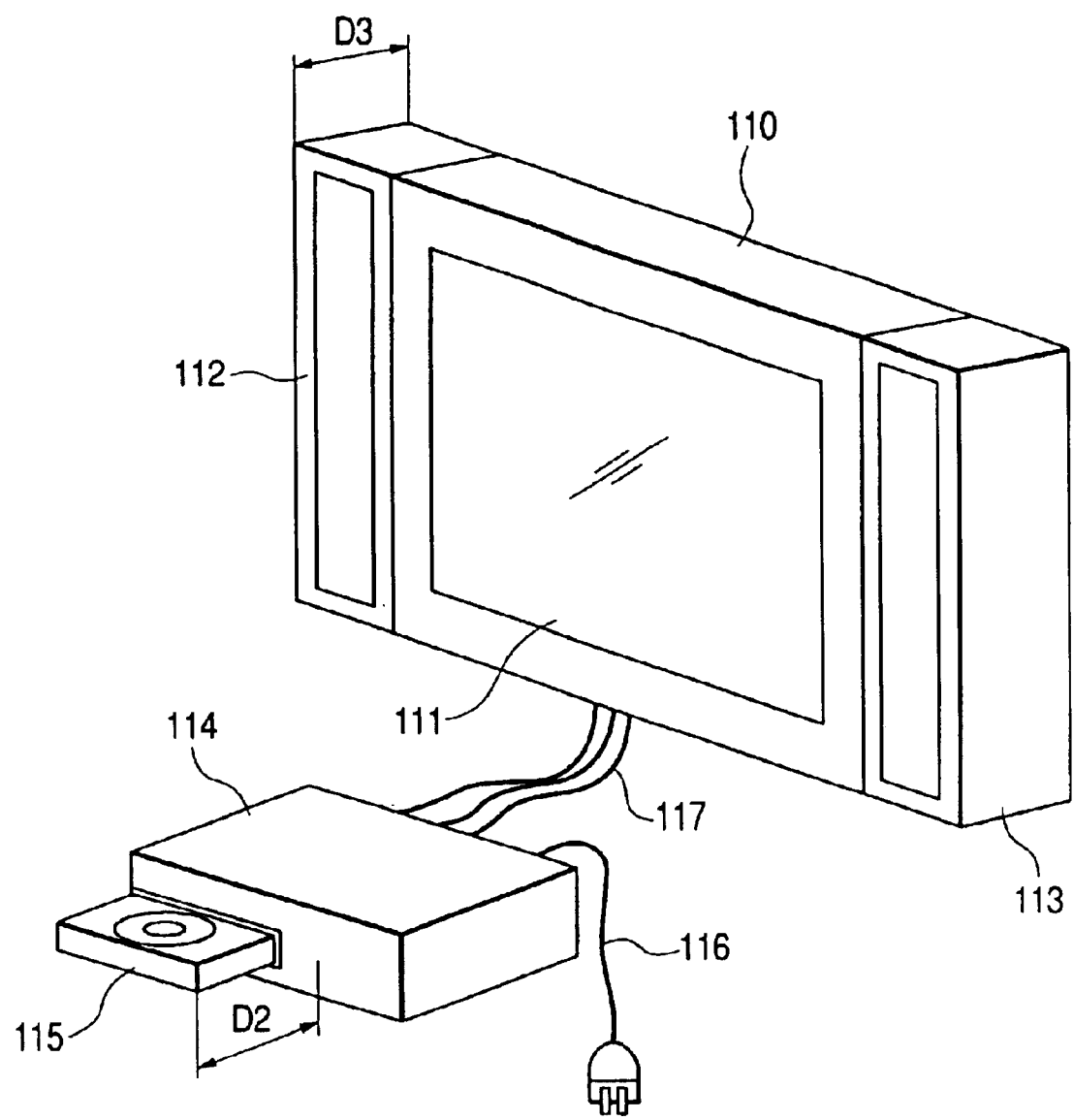
FIG. 15 is a diagram showing the appearance of an another image display apparatus.

FIGS. 13A and 13B are structural diagrams showing the recording/reproducing unit 5 in accordance with this embodiment, and FIG. 13A is a plan view thereof whereas FIG. 13B is a side view thereof.

In the figures, reference numeral 70 denotes a disc tray that has an opening portion and a circular recess portion in the center thereof and has a storage medium which will be described later mounted thereon. Reference numeral 71 represents a disc that is a storage medium, and though there recently exist various discs such as a CD, a CD-ROM or a DVD, these are uniformly disc-shaped and 120 (mm) in diameter and 2 (mm) or less in thickness. Reference numeral 72 denotes a spindle motor for rotating the disc 71, and 73 is a turn table that connects the rotary shaft to the spindle motor 72 and has the disc 71 mounted thereon to rotate. Reference numeral 74 represents an important part of the recording/reproducing unit 15, that is, an optical pickup for optically reading information recorded in the disc 71 which includes a light source, an objective lens, a light receiving unit and the like. A laser beam of about 650 (nm) or 780 (nm) is irradiated onto the optical pickup from the light source, and the light receiving unit detects a reflected light from the disc 71. Reference numeral 75 denotes an actuator that conducts the focusing adjustment with respect to the light source and the objective lens 74 for accurately detecting the reflected light from the disc 71 and the tracking adjustment. Reference numeral 76 denotes a carriage having the light source, the objective lens 74 and the actuator 75 mounted thereon, which is movable two-dimensionally in parallel with the disc 71 by a drive mechanism which will be described later. Reference numeral 77 denotes a guide mechanism that functions as a guide when the carriage 76 is moved, and a mechanism that finely adjusts the position which is not shown is fitted to a mounting portion of the guide mechanism 77. Reference numeral 78 denotes a pickup drive mechanism for making the carriage 76 movable, which is made up of a feed motor and a plurality of gears, and those gears are meshed with a rack gear (not shown) of the carriage 76. Reference numeral 79 denotes a main body of the recording/reproducing unit 5 that houses the guide mechanism 77, the pickup drive mechanism 78, and the control circuit of the recording/reproducing unit 5, the signal processing circuit and the like which are not shown, and conducts the operation of the projection/housing with respect to the image display apparatus 1.

In the structure mentioned above, the outer dimensions of the main body 79 that houses the structure for housing the disc 71, driving the disc 71 and reading the recording information of the disc 71 are 120 to 146 (mm) in width, 150 to 203 (mm) in depth (D2) and 25 to 40 (mm) in thickness.

With the above structure, in the first embodiment, the arrangement of the recording/reproducing unit 5 to be built in the image display apparatus 1 is determined as shown in FIG. 2. That is, in order to house the recording/reproducing unit 5 within the thickness (depth) 80 to 100 (mm) of the image display apparatus 1, the thickness 25 to 40 (mm) of the recording/reproducing unit 5 is set to coincide with the depthwise direction (D3) of the image display apparatus 1.

Then, the operation of the image display apparatus 1 thus structured in accordance with the first embodiment of the present invention will be described.

In the image display apparatus 1 according to the first embodiment, in a normal state, the recording/reproducing unit 5 is housed in the main body of the image display apparatus 1 as shown in FIG. 2A. Thus, the recording/reproducing unit 5 is shielded against incoming dust or an external shock. Also, the recording/reproducing unit 5 is so disposed as to be opposed to the image display unit 2 at the rear side of the image display unit 2 in the interior of the image display apparatus 1. This is because the features of the thin type display apparatus of the image display apparatus 1 is effected as described above. In this example, in the case where the user plays the video by using the recording/reproducing unit 5, the following operation is made.

The user conducts a command of the projection of the recording/reproducing unit 5 (extraction: opening operation) from the remote control 50 attached to the image display apparatus 1. The projection command is coded inside the remote control 50, and the coded electric signal is converted into an infrared ray and then transmitted to the receiving unit 51 of the image display apparatus 1. As a result, the receiving unit 51 receives and identifies the coded signal and gives the projection command of the recording/reproducing unit 5 to the control circuit 52. The control circuit 52 executes program programmed in advance in accordance with the projection command and supplies a control signal corresponding to the projection command to the drive circuit 55. As a result, a drive current is fed to the up/down motor 6 from the drive circuit 55 to rotationally drive the up/down motor 6. Upon starting of the rotation of the up/down motor 6, the gear 7 fixed to the rotary shaft thereof rotates, and the reduction gear 8 that is meshed with the gear 7 also rotates, and the rotation is transmitted to the rotary screw shaft 9 that is meshed with the reduction gear 8. In this way, upon starting of the rotation of the rotary screw shaft 9, the female screw portion 12 that is meshed with the rotary screw shaft 9 starts to move down. This is because the gears formed in the outer periphery of the rotary screw shaft 9 have a constant lead angle, and therefore the female screw portion 12 having the same lead angle therein has a rotation stop guide (not shown) in the vicinity thereof, thereby moving vertically with respect to the shaft 9.

In this example, the control circuit 52 always identifies the amount of rotation in the up/down motor 6 on the basis of the encoder signal and recognizes the downwardly moving position of the female screw portion 12. As a result, when the recording/reproducing unit 5 starts to move down from a position of FIG. 2A to reach a position where it starts to project from the bottom surface of the image display apparatus 1 as shown in FIG. 2B, to incline the recording/reproducing unit 2, a drive current is also transmitted to the rotary drive motor 13. When the rotary drive motor 13 starts to rotate, the gear 14 fixed to the rotary shaft of the motor 13 rotates, and the reduction gear 15 that is meshed with the gear 14 rotates, to thereby start to rotate the rotary gear 16 that is meshed with the reduction gear 15. Because the rotary gear 16 is fixed onto the side surface portion of the recording/reproducing unit 5, the rotating operation of the rotary gear 16 becomes the rotating operation of the recording/reproducing unit 5 as well. The female screw portion 12 continues to move down even while the rotating operation is conducted.

Because the amount of rotation of the rotary drive motor 13 is also identified on the basis of the encoder signal, the control circuit 52 can recognize the rotating position of the recording/reproducing unit 5.

FIG. 2C is a diagram showing a state (extraction completion) in which the female screw portion 12 has completely moved down and the rotating operation of the recording/reproducing unit 5 is also completed.

Thereafter, the user loads a recording medium (not shown) such as a DVD into the recording/reproducing unit 5 and conducts a command for housing the recording/reproducing unit 5 (close operation) from the remote control 50 attached to the above image display apparatus 1. The housing command is made in such a manner that an electric signal coded inside the remote control 50 is produced, and the electric signal is converted into an infrared ray and then transmitted to the receiving unit 51 of the image display apparatus 1. The receiving unit 51 receives the coded infrared ray and identifies the code and gives the housing command to the control circuit 52. The control circuit 52 transmits a control signal corresponding to the housing command to the drive circuit 55 in accordance with a program code programmed in advance. As a result, the drive current is supplied to the up/down motor 6 and the rotary drive motor 13 from the drive circuit 55. Because the drive current is opposite in polarity to that in the case of the above projection command, the rotating directions of the both motors 6 and 13 are also opposite. As a result, the recording/reproducing unit 5 rotates to the left (counterclockwise) and the female screw portion 12 starts to move up.

When the recording/reproducing unit 5 moves up and becomes in a state shown in FIG. 2B, the rotating operation of the rotary drive motor 13 stops and when the recording/reproducing unit 5 returns to the state in which the recording/reproducing unit 5 is being housed as shown in FIG. 2A, the up/down motor 6 stops to rotate, and the housing operation is completed. Thereafter, the user can enjoy a video, a music and so on reproduced from the recording/reproducing unit 5 by giving a recording/reproducing command and an image display command from the remote control 50 attached to the image display apparatus 1.

Figure 4:
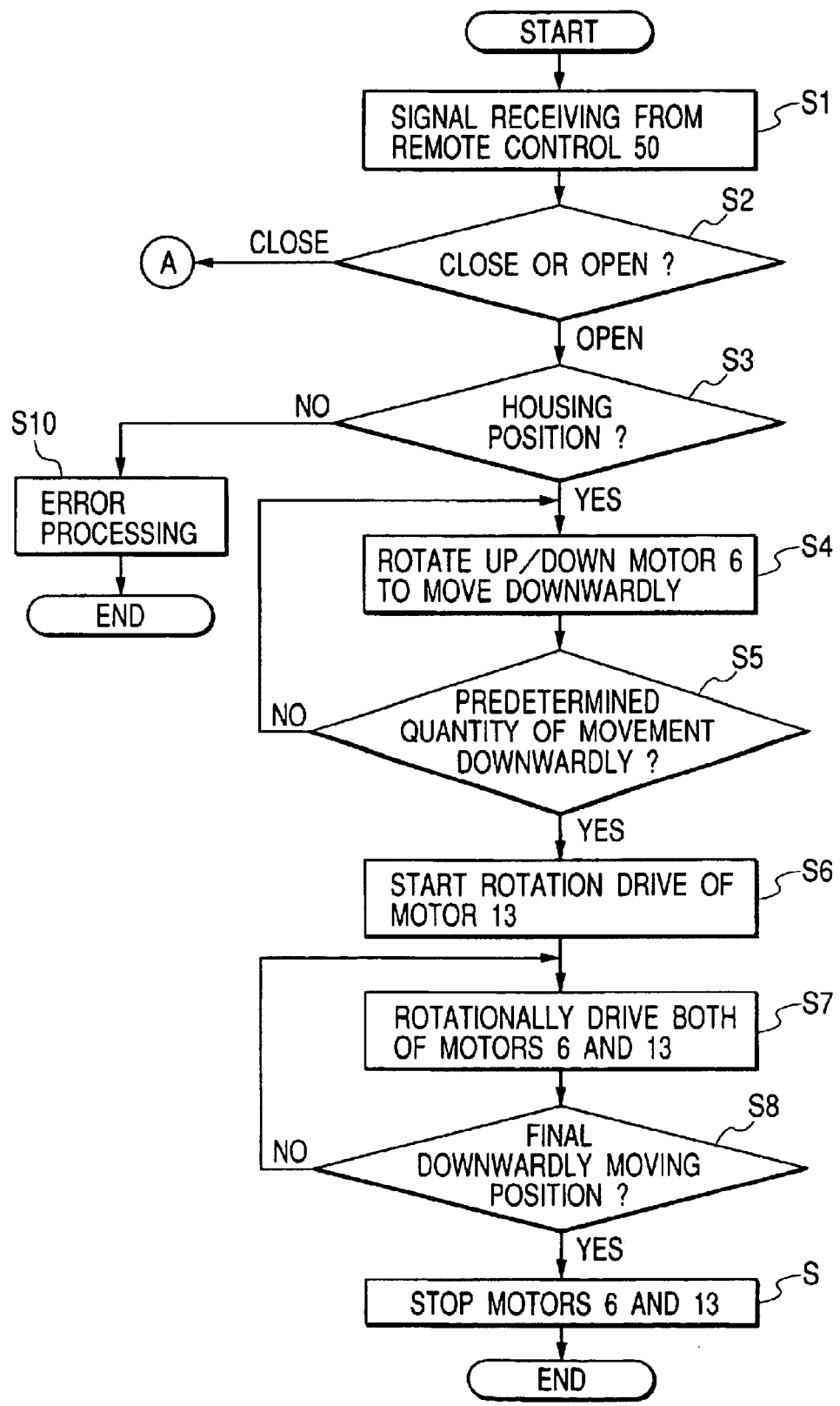
FIG. 4 is a flowchart showing control processing by a control circuit of the image display apparatus in accordance with the first embodiment of the present invention.
Figure 5:
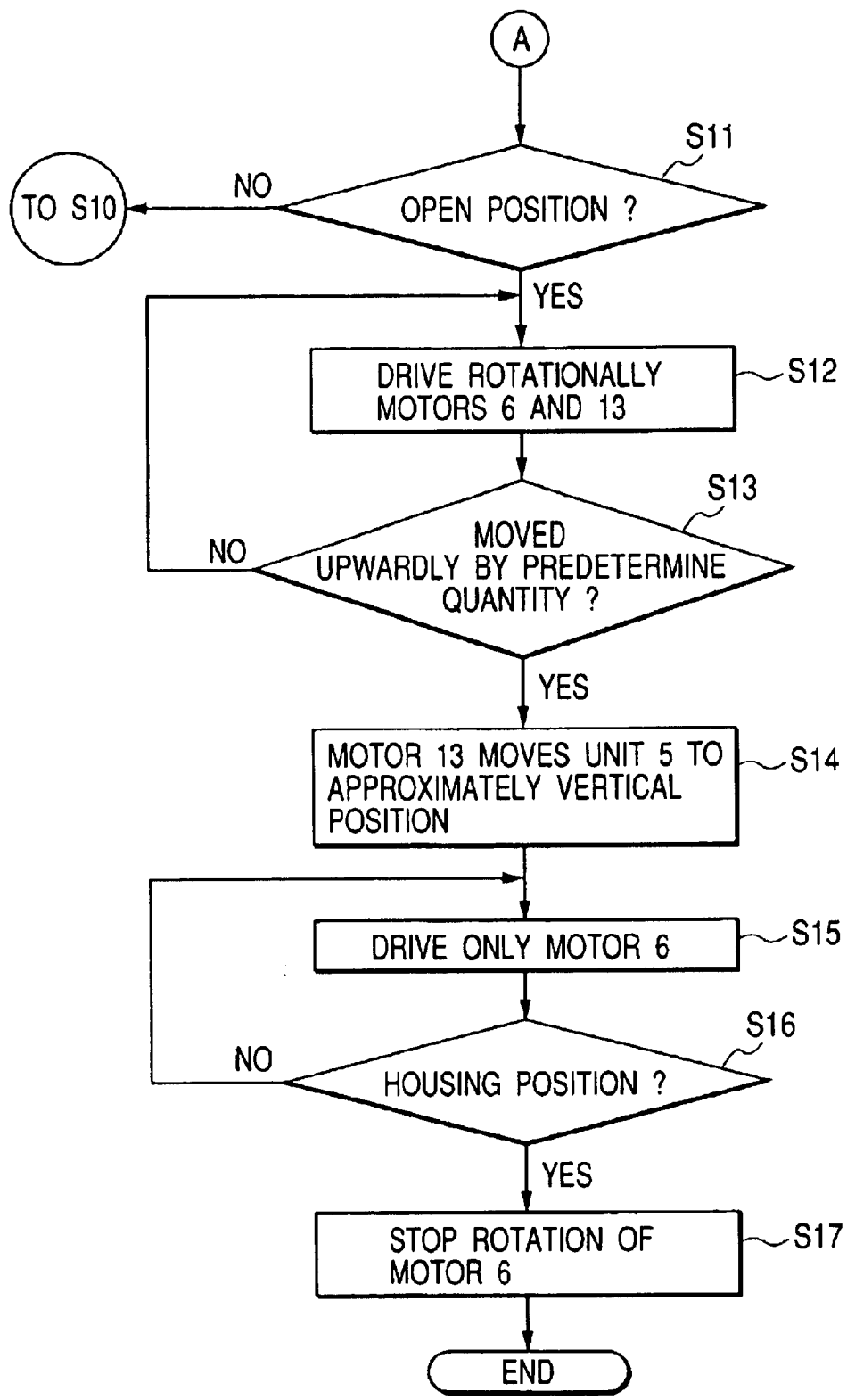
FIG. 5 is a flowchart showing control processing by the control circuit of the image display apparatus in accordance with the first embodiment of the present invention.

FIGS. 4 and 5 are flowcharts showing the projection/housing processing of the recording/reproducing unit 5 by the control circuit 52 of the image display apparatus 1 in accordance with the first embodiment, and the program for executing the processing is stored in a memory 52a.

First, in step S1, a command instructed by an infrared ray from the remote control 50 is analyzed, and in step S2, it is judged whether the instructed command is open (extracting) or close (housing). In case of the open command, the procedure advances to step S3 in which it is judged whether the recording/reproducing unit 5 has been housed in a housing position shown in FIG. 2A, or not. The judgment can be conducted by, for example, a sensor not shown. If not, the procedure advances to step S10, in which no processing is made as an error, or the unit 5 is housed in the housing position once.

If the recording/reproducing unit 5 is at the housing position in step S3, the procedure advances to step S4, and up/down motor 6 is rotationally driven so that the female screw portions 12, thus the recording/reproducing unit 5, moves downward. In this situation, the amount of rotation of the up/down motor 6, that is, the amount of downward movement of the recording/reproducing unit 5 is detected on the basis of a signal from the encoder signal generating unit disposed in the rotary shaft of the up/down motor 6, and when the amount of downward movement reaches a predetermined amount in step S5, the procedure advances to step S6, in which the rotary motor 13 starts to rotate, and starts to drive the recording/reproducing unit 5 so as to rotate clockwise as shown in FIG. 2B.

Then, in step S7, while the up/down motor 6 rotates, the rotary motor 14 is also rotationally driven so as to rotate clockwise in accordance with the downward movement of the recording/reproducing unit 5. Then, in step S8, the recording/reproducing unit 5 reaches the lowest portion, and completes the rotation in the clockwise direction. Then, as shown in FIG. 1, the recording/reproducing unit 5 becomes in a state where it is projected from the lower portion of the image display apparatus 1, and the exchange and installation of the storage medium in the recording/reproducing unit 5 can be made by the user.

Then, when the housing of the recording/reproducing unit 5 is commanded in the above-described step S2, the procedure then advances to step S11 in which it is judged whether the recording/reproducing unit 5 is in a projected state as shown in FIG. 1, that is, at the open position, or not. If the recording/reproducing unit 5 is at the open position, the procedure advances to step S12 whereas if it is not at the open position, the procedure advances to error processing in step S1. In step S12, the up/down motor 6 is rotationally driven in the direction opposite to that in case of the above-described step S4, thereby starting to move up the recording/reproducing unit 5, and with this move up, the rotary motor 13 is rotationally driven in the direction opposite to that in the above-described step S6. As a result, the recording/reproducing unit 5 is rotationally driven counterclockwise while moving up. In this way, if the recording/reproducing unit 5 moves up by a given length in step S13, the procedure advances to step S14, and the recording/reproducing unit 5 is rotated counterclockwise by the motor 13 until the recording/reproducing unit 5 becomes substantially vertical. Thereafter, the procedure advances to step S15 in which the up/down motor 6 is further rotated to move up the recording/reproducing unit 5, and when the recording/reproducing unit 5 reaches its housing position in step S16, the procedure advances to step S17 in which the rotation of the up/down motor 6 stops, thus completing the processing.

According to the first embodiment, not only the operation of moving down the recording/reproducing unit 5, but also the operation of rotating the recording/reproducing unit 5 are added. This is because, in addition to a setting method of hanging the image display apparatus 1 on a wall, there may be proposed a method of installing the recording/reproducing unit 5 on a table by using a stand (not shown) or the like. That is, when the recording/reproducing unit 5 is located on the table as in the latter case, a space distance between the bottom portion of the image display apparatus 1 and an upper surface of the table becomes slight, and the lower portion of the recording/reproducing unit 5 collides with the upper surface of the table, thereby being incapable of functioning. Therefore, as in the first embodiment, the collision of the recording/reproducing unit 5 with the table is prevented by rotating the recording/reproducing unit 5, and an angle at which the user can readily load the recording medium (not shown) in the recording/reproducing unit 5 is given.

Also, in the first embodiment, all of the control of the move-down end and the move-up end by the up/down motor 6, and a timing at which the rotary drive motor 13 starts and stops to rotate are conducted by processing the encoder signals from the respective motors 6 and 13. Alternatively, it is possible that a means for detecting the position of the recording/reproducing unit 5 is provided, and a timing of that control operation may be determined.

Also, the up/down motor 6 is attached to the female screw portion 12, and the rotation of the recording/reproducing unit 5 is controlled through a clutch mechanism, thereby being capable of making the up/down motor 6 and the rotary drive motor 13 common to one motor.

Also, even if a PDP or a liquid crystal panel is used for the image display unit 1, the features of this embodiment can be effected.

This embodiment also has the following advantages.

(1) The use of an image display panel (SED) using electron-emitting devices for the image display unit 1 is used, thereby being capable of structuring a thin-type image display apparatus and of saving a space by setting the image display apparatus on a wall.

(2) Because the recording/reproducing unit 5 is located at a position that faces a rear side of the image display unit 1 of the image display apparatus 1, no space in which the recording/reproducing unit 5 is located is required while maintaining the features of the thin-type image display apparatus.

In addition, this embodiment is preferable from the viewpoint of the appearance because the cable that connects the image display apparatus 1 and the recording/reproducing unit 5 is not exposed from the wall face.

(3) Because the recording/reproducing unit 5 is perfectly housed in the interior of the image display apparatus 1, the recording/reproducing unit 5 is protected from the entrance of dust or an impact due to the main body cover of the image display apparatus 1.

(4) As a result of combining the mechanism of the projecting/housing operation of the recording/reproducing unit 5 with the motor and the gear that operate in accordance with a command from the electric circuit, because all of the open/close operation of the recording/reproducing unit 5 can be instructed with an attached remote control, the operability is excellent.

(5) The projecting/housing operation of the recording/reproducing unit 5 is realized by combination of the up/down movement of the recording/reproducing unit 5 with the rotary movement, thereby being capable of installing the recording/reproducing unit 5 on a table, for example, by using a stand or the like. In addition, the ease of loading the recording medium is improved.

(Second Embodiment)

Figure 6:
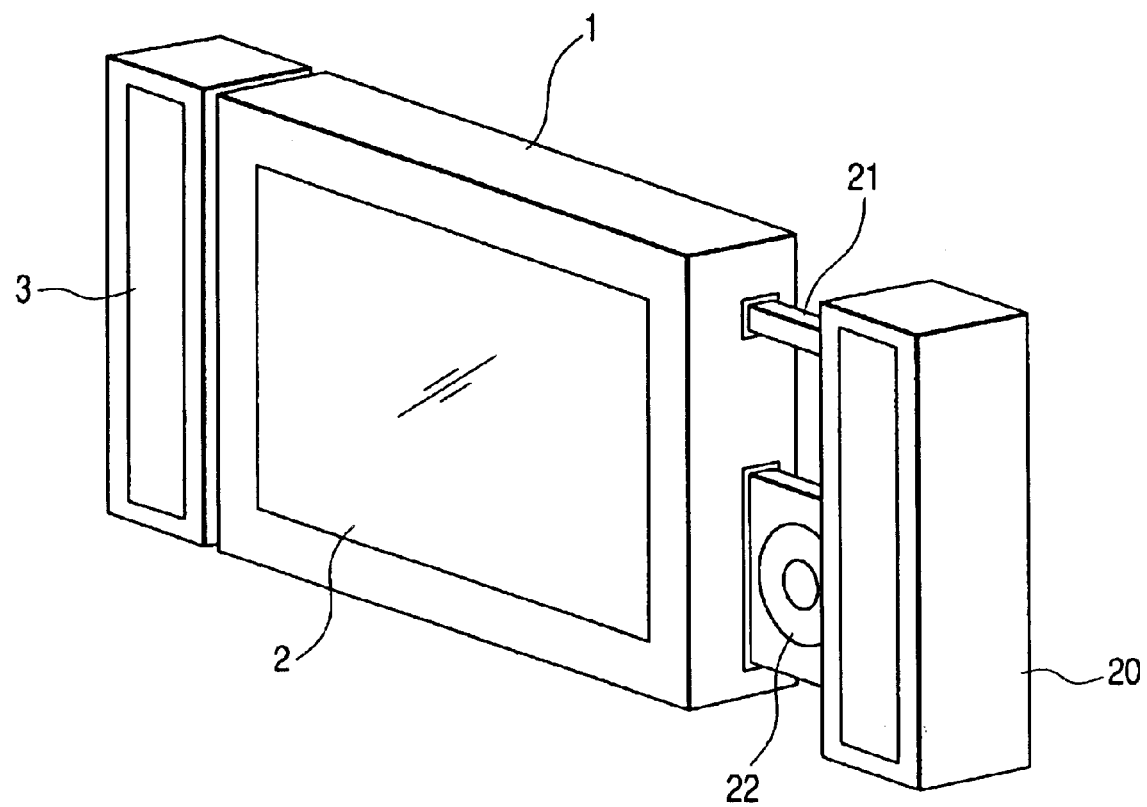
FIG. 6 is diagram showing the appearance of an image display apparatus in accordance with a second embodiment of the present invention.

FIG. 6 is a diagram showing the appearance of the image display apparatus 1 in accordance with a second embodiment of the present invention, in which the parts common to those in the above-mentioned first embodiment are designated by identical reference numerals, and their description will be omitted.

Referring to FIG. 6, reference numeral 20 denotes a movable right speaker that has a structure of connecting the recording/reproducing unit 22 on the wall face that faces the image display apparatus 1 and is slid and fitted to the image display apparatus 1 so as to be movable rightward. Reference numeral 21 denotes a guide bar that prevents backlash that occurs when the movable right speaker 20 is slid and moved, and one end portion of the guide bar 21 is fixed to the wall surface of the movable right speaker 20, and another counter end portion is slidably attached to the interior of the image display apparatus 1. Although not shown in the figure, a lubricative member in the interior of the image display apparatus 1 into which the guide bar 21 is inserted positions the guide bar 21. The recording/reproducing unit 22 functions as a recording/reproducing means that outputs a reproduced image signal and an audio signal to the image display unit 2.

In a normal use, because the recording/reproducing unit 22 is housed in the interior of the image display apparatus 1, and the movable right speaker 20 is substantially in close contact with the right side portion of the image display apparatus 1, the structure cannot be viewed from the external.

Figure 7A:
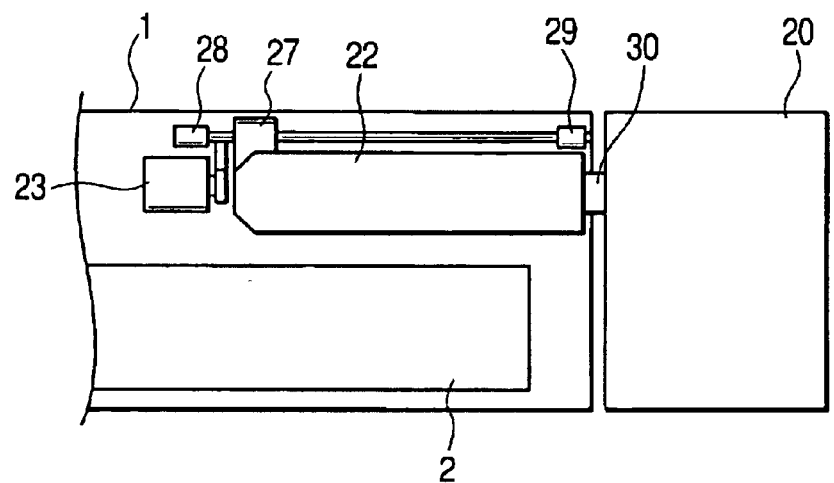
FIGS. 7A and 7B are lateral cross-sectional views showing the main portion of the image display apparatus in accordance with the second embodiment of the present invention.
Figure 7B:
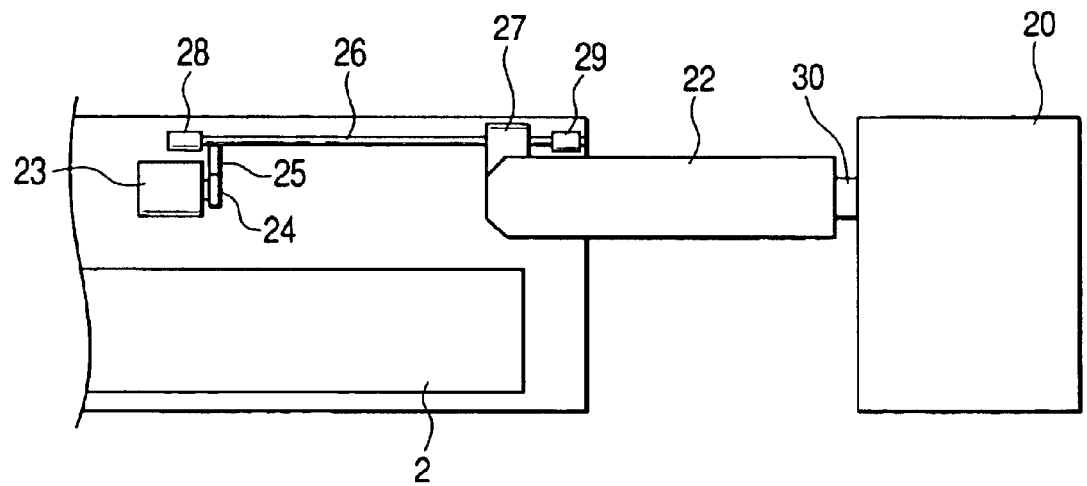

FIGS. 7A and 7B are lateral cross-sectional views showing the main structure of the image display apparatus 1 in accordance with the second embodiment of the present invention, and shows the internal structures of the movable right speaker 20 and the recording/reproducing unit 22.

FIG. 7A is a diagram showing a state of housing the movable right speaker 20 and the recording/reproducing unit 22 in which the parts common to those in FIG. 6 are designated by identical reference numerals.

FIG. 7B shows a state in which the movable right speaker 20 and the recording/reproducing unit 22 are moved rightward, to complete those movements.

In this example, reference numerals 23 to 29 constitute the moving structure of the speaker which is a peripheral device. Reference numeral 23 denotes a movement motor which is fixed to the interior of the image display apparatus 1. The rotary shaft of the motor 23 is fitted with an encoder signal generating structure, and an encoder signal from the encoder is supplied to the control circuit as in the above-described first embodiment. Reference numeral 24 denotes a gear which is fixed to the rotary shaft of the movement motor 23. Reference numeral 25 denotes a reduction gear which is meshed with the gear 24 fitted to the interior of the image display apparatus 1 to reduce the rotary speed. Reference numeral 26 denotes a rotary screw shaft which is supported by bearings 28 and 29 and meshed with the reduction gear 25 to rotate. Reference numeral 27 denotes a female screw portion fixed to the recording/reproducing unit 22 which is meshed with the rotary screw shaft 26 and allows the recording/reproducing unit 22 to move right and left due to the rotation of the rotary screw shaft 26. The left bearing 28 and the right bearing 29 have the end portion of the rotary screw shaft 26 inserted therein together, and lubricative bearings are built in the interior of each of the left and right bearings 28 and 29 so as to rotatably support the rotary screw shaft 26. Reference numeral 30 denotes a coupling member for fixing and connecting the movable right speaker 20 and the recording/reproducing unit 22.

Note that, in FIGS. 7A and 7B, the above-mentioned guide bar 21 in FIG. 6 is omitted. Also, because the structure of the image display apparatus according to this embodiment is identical with that of the above-described first embodiment shown in FIG. 3, its description will be omitted.

Subsequently, the operation of the above-mentioned structure will be described.

In the image display apparatus 1 according to the second embodiment, in a normal state, the above-mentioned recording/reproducing unit 22 is housed as shown in FIG. 7A. This is because the recording/reproducing unit 22 is covered with the image display apparatus 1, to thereby protect the entrance of dusts and an impact. Also, the recording/reproducing unit 22 is disposed at the rear side of the image display unit 2 of the image display apparatus 1 so as to face the image display unit 2. This is because the features of the thin-type of the image display apparatus 1 is utilized.

In this example, the following operation is made in the case where the user reproduces and play video by using the recording/reproducing unit 22.

The user gives a command for projecting the recording/reproducing unit 22 (open operation) from the remote control 50 attached to the image display apparatus 1.

As a result, a drive current is fed to the motor 23 from the drive circuit 55. With this operation, when the motor 23 starts to rotate, the gear 24 fixed to its rotary shaft rotates, and the reduction gear 25 which is meshed with the gear 24 also rotates at the same time. In addition, the rotary screw shaft 26 meshed with the reduction gear 25 also starts to rotate. When the rotary screw shaft 26 starts to rotate, the female screw portion 27 meshed with the rotary screw shaft 26 starts to rotate rightward. This is because the gears formed in the outer periphery of the rotary screw shaft 26 have constant lead angles, and the female screw portion 27 having the same lead angle in the interior thereof has a rotation stop guide in the vicinity thereof although being not shown, and therefore the female screw portion 27 moves horizontally. Also, because the control circuit 52 inputs an encoder signal from the motor 23 and conducts identification processing, the position or the amount of movement of the female screw portion 27 is recognized.

When the recording/reproducing unit 22 starts to project from the right surface of the image display apparatus 1, because the movable right speaker 20 is connected to the recording/reproducing unit 22 through the coupling member 30, the movable right speaker 20 moves rightward in synchronism with the movement of the recording/reproducing unit 22.

When the movable right speaker 20 thus moves up to the position shown in FIG. 7B (the position of projection completion), the drive current from the drive circuit 55 to the motor 23 stops in accordance with the contents programmed in the control circuit 52 in advance.

Thereafter, the user loads the recording medium (not shown) in the recording/reproducing unit 22 from the front side of the image display apparatus 1, and gives a command for housing the recording/reproducing unit 22 (close operation) from the remote control attached to the image display apparatus 1. As a result, the drive current is fed to the motor 23 from the drive circuit 55 controlled by the control circuit 52. Because the drive current is opposite in polarity to that in case of the projection command, the rotating direction of the motor 23 becomes reversed and the female screw portion 27 starts to move leftward. For that reason, the recording/reproducing unit 22 and the movable right speaker 20 also move in the housing direction (that is, leftward).

In this way, as shown in FIG. 7A, the present state returns to the state in which the recording/reproducing unit 22 is housed, and the motor 23 stops, to thereby complete the housing operation. Thereafter, the user gives a recording/reproducing command and an image display command from the remote control 50 attached to the image display apparatus 1 so that he can enjoy video and audio.

Figure 8:
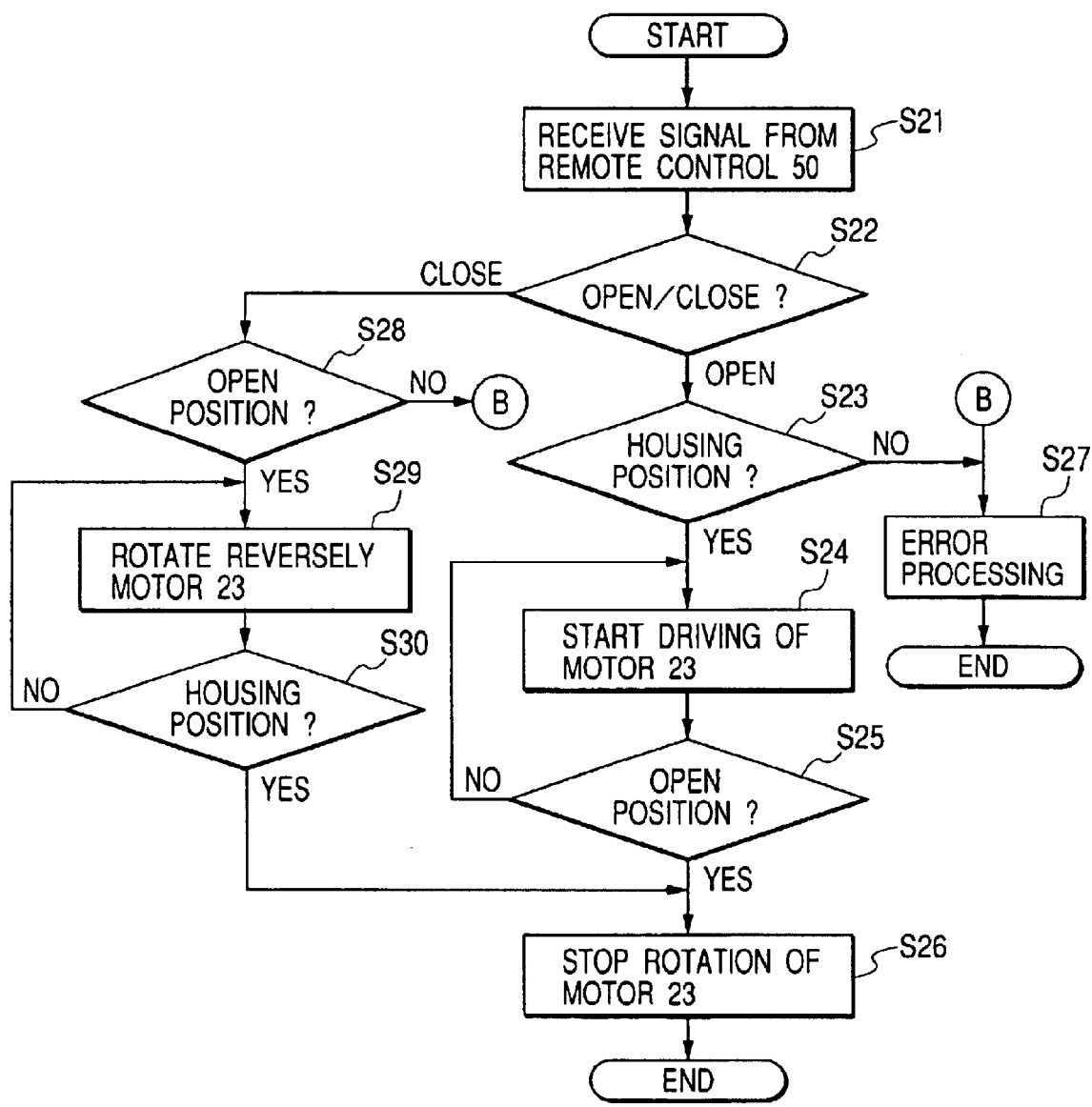
FIG. 8 is a flowchart showing control processing by a control circuit of the image display apparatus in accordance with the second embodiment of the present invention.

FIG. 8 is a flowchart showing an extraction/housing processing of the recording/reproducing unit 22 in the image display apparatus in accordance with the second embodiment, and this processing is executed by the above-mentioned control circuit 52. Also, the program that executes this processing is stored in the memory 52a.

First, when a signal is received from the remote control 50 by the user's operation in step S21, the procedure advances to step S22, in which it is judged whether the signal is the projection or housing commands of the recording/reproducing unit 22 (open or close), and if the signal is the open command, the procedure advances to step S23 in which it is judged whether the recording/reproducing unit 22 is at a housing position, or not. If the recording/reproducing unit 22 is at the housing position, the procedure advances to step S24, in which drive current is supplied to the motor 23 through the drive circuit 55, to thereby start to rotationally drive the motor 23. As a result, the gear 24 fixed to the rotary shaft of the motor 23 rotates, and when the rotation of the gear 24 is transmitted to the rotary screw shaft 26 to start the rotation of the rotary screw shaft 26, the female screw portion 27 meshed with the rotary screw shaft 26 starts to move rightward in FIG. 7A. In step S25, the control circuit 52 inputs the encoder signal of the motor 23, recognizes the position or the amount of movement of the female screw portion 27, and judges whether the recording/reproducing unit 22 has moved up to the position shown in FIG. 7B (the position of projection completion) or not. Upon the completion of judgment, the procedure advances to step S26 in which the drive current from the drive circuit 55 to the motor 23 stops, to thereby stop the drive of the motor 23.

Also, if the signal represents the close processing in the step S22, the procedure advances to step S28 in which it is judged whether the recording/reproducing unit 22 is at the projection completion position shown in FIG. 7B or not, and if yes, the procedure advances to step S29 in which a drive current opposite in polarity to that in the case of the projection command is supplied to the motor 23 by the drive circuit 55. As a result, the rotating direction of the motor 23 becomes reversed, and the female screw portion 27 starts to move leftward from the state shown in FIG. 7B, and the recording/reproducing unit 22 and the movable right speaker 20 also move in the housing direction. Then, the procedure advances to step S30, in which it is judged whether the recording/reproducing unit 22 has been housed, or not, on the basis of the encoder signal as shown in FIG. 7A. If the judgment is made that the recording/reproducing unit 22 has been housed, the procedure advances to step S26, in which the supply of the drive current to the motor 23 stops, to thereby complete the housing operation. If the recording/reproducing unit 22 is not at the housing position or at the projection completion position in steps S23 and S28, the procedure advances to step S27 in which the error processing is executed to complete the processing.

As described above, according to the second embodiment, the recording/reproducing unit 22 is so structured as to project from the side portion of the image display apparatus 1. This is because various circumstances are taken into consideration in addition to the installing method in which the image display apparatus 1 is hung on the wall. Also, in the case where the image display apparatus 1 is located on a table by using a stand (not shown) or the like, a space distance between the bottom portion of the image display apparatus 1 and the top surface of the table becomes slight, and there is the possibility that the structure becomes complicated in order to project the recording/reproducing unit 22 from the bottom portion. Also, in the case where the image display apparatus 1 is located at a higher place of the wall, when the recording/reproducing unit 22 is projected from a ceiling portion, it becomes difficult to load the recording medium (not shown) in the recording/reproducing unit 22.

As described above, according to this embodiment, the recording/reproducing unit 22 is so structured as to project from the right surface of the image display apparatus 1. It is needless to say that if the structure is inverted symmetrically, the recording/reproducing unit 22 can be projected from the left side.

As described above, the second embodiment has the following features.

(1) An image display panel using electron-emitting devices for the image display unit 2 is used, thereby being capable of structuring a thin-type image display apparatus and of saving a space by setting the image display apparatus on a wall.

(2) Because the recording/reproducing unit is located at a position that faces a rear side of the image display unit of the image display apparatus 1, no space in which the recording/reproducing unit is located is required while maintaining the features of the thin-type image display apparatus.

In addition, this embodiment is preferable from the viewpoint of the appearance because the cable that connects the image display apparatus 1 and the recording/reproducing unit is not exposed to the outside.

(3) Because the recording/reproducing unit is perfectly housed in the interior of the image display apparatus 1, the recording/reproducing unit is covered by the image display apparatus and protected from the entrance of dusts and an impact to improve the reliability.

(4) As a result of combining the mechanism of the projecting/housing operation of the recording/reproducing unit with the motor and the gear that operate in accordance with a command from the electric circuit, because all of the open/close operation is realized by the attached remote control, the operability is excellent.

(5) Since the projection/housing operation of the recording/reproducing unit is at the right surface of the image display apparatus 1 (or may be at the left surface), regardless of whether the image display apparatus 1 is located on a table by using a stand or hung on a wall at a higher place, the ease of loading the recording medium is improved.

(6) In addition, since there is no necessity that the size of the speaker is reduced so as to eliminate an obstruction caused by the projecting operation of the recording/reproducing unit, the sound quality reproduced is not deteriorated.

(Third Embodiment)

Figure 9:
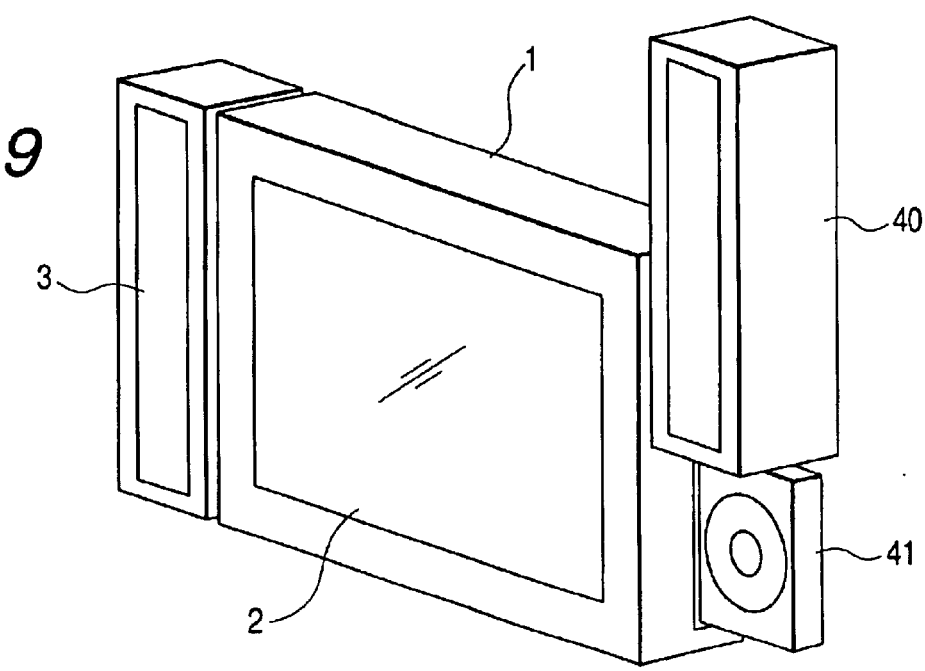
FIG. 9 is diagram showing the appearance of an image display apparatus in accordance with a third embodiment of the present invention.

FIG. 9 is a diagram showing the appearance of an image display apparatus 1 in accordance with a third embodiment of the present invention, in which the parts common to those in the above-mentioned first and second embodiments are designated by identical reference numerals, and their description will be omitted.

Referring to FIG. 9, reference numeral 40 denotes a movable right speaker that has an up/down drive mechanism and a guide portion which will be described later on a wall surface portion that faces the image display apparatus 1 and is movable upward with respect to the image display apparatus 1. Reference numeral 41 denotes a recording/reproducing unit that outputs a reproduced image signal and an audio signal to the image display apparatus 1.

In a normal use, because the recording/reproducing unit 41 is housed in the interior of the image display apparatus 1, and the movable right speaker 40 is substantially in close contact with the right side portion of the image display apparatus 1, the structure cannot be viewed from the external.

Figure 10A:
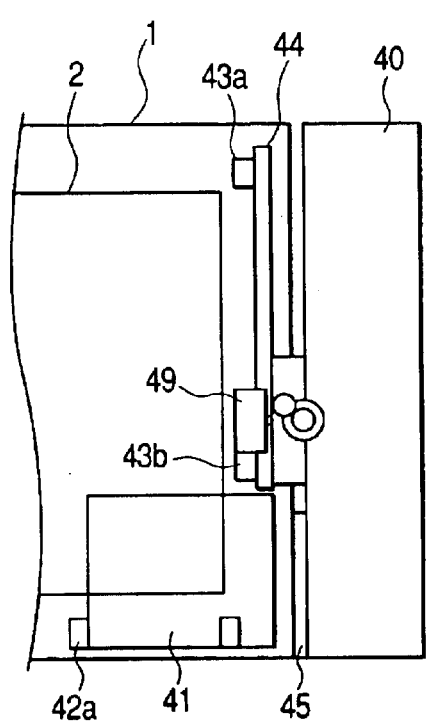
FIGS. 10A and 10B are front perspective views showing the main portion of the image display apparatus in accordance with the third embodiment of the present invention.
Figure 10B:
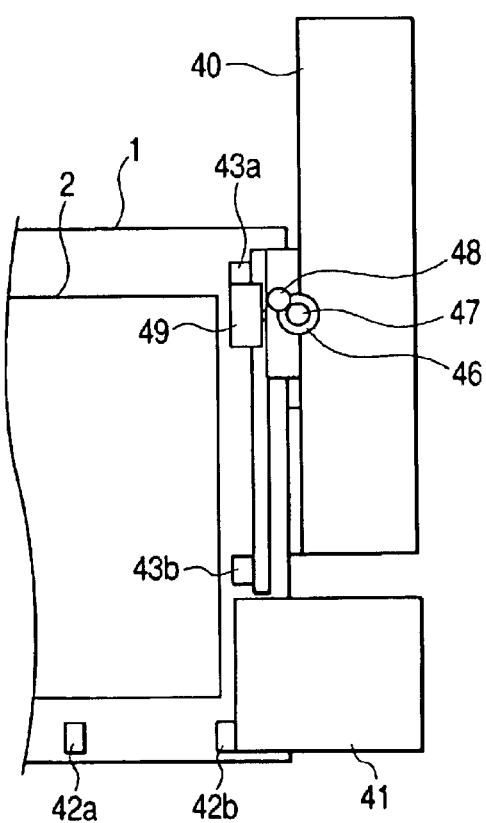

FIGS. 10A and 10B are front perspective views showing the main portion of the image display apparatus 1 in accordance with the third embodiment of the present invention, and shows the arrangement and the movement of the image display unit 2, the movable right speaker 40 and the recording/reproducing unit 41.

FIG. 10A is a diagram showing a state of the recording/reproducing unit 41 housed in the interior of the image display apparatus 1, and FIG. 10B is a diagram showing a state in which the movable right speaker 40 and the recording/reproducing unit 41 have been completely projected. Parts common to those shown in FIG. 9 and the above-mentioned first and second embodiments are designated by identical reference numerals, and the third embodiment will be described with reference to an electric block diagram as in the above-mentioned first embodiment.

Referring to FIGS. 10A and 10B, reference numeral 42a denotes a position sensor which is used for detecting whether the recording/reproducing unit 41 is in a housing completion state or not. Reference numeral 42b denotes a position sensor likewise which is used for detecting whether the recording/reproducing unit 41 is in a projection completion state or not. Reference numeral 43a denotes a position sensor for detecting whether the movable right speaker 40 is in a move-up completion state or not. Also, reference numeral 43b denotes a position sensor for detecting whether the movable right speaker 40 is in a move-down completion state or not. Those sensors 42a, 42b, 43a and 43b are fixed to the interior of the image display apparatus 1 together and electrically connected to the control circuit 52.

In this example, reference numerals 44 to 49 constitute the structure for moving a speaker, and more particularly reference numeral 44 constitutes a moving structure which is disposed at the image display apparatus casing side. Reference numeral 44 denotes a rack gear which is fixed to the interior of the image display apparatus 1 where gears are continuously formed. Reference numeral 45 denotes a guide portion which is fixed to a wall surface of the image display apparatus 1 side of the movable right speaker 40 and inserted into a rail (not shown) formed on the side portion of the image display apparatus 1. Reference numeral 46 denotes a motor which is fixed to the movable right speaker 40 and electrically connected to the drive circuit 55 as in the above-mentioned first embodiment. Reference numeral 47 denotes a gear fixed to the rotary shaft of the motor 46. Reference numeral 48 denotes a reduction gear which is fixed to the movable right speaker 40 and meshed with the gear 47 to reduce the rotation speed. The reduction gear 48 is so structured as to be meshed with the rack gear 44 disposed in the interior of the image display apparatus 1. Reference numeral 49 denotes a rack presser which is fixed to the movable right speaker 40 and so disposed as to hold the rack gear 44 by the interior of the image display apparatus 1. The rack presser 49 prevents the mesh of the reduction gear 47 from falling down from the rack gear 44 while moving up and down in association with the up/down movement of the movable right speaker 40.

Then, the operation of the above structure will be described.

In the image display apparatus 1 according to the third embodiment, in the normal state, the recording/reproducing unit 41 is housed in the main body of the image display apparatus 1. This is because the recording/reproducing unit 41 is covered by the image display apparatus 1 so as to be protected from the entrance of dust and an impact. Also, the reason that the recording/reproducing unit 41 is so disposed as to face the image display unit 2 at the rear side of the image display unit 2 of the image display apparatus 1 is because the feature of the thin type of the image display apparatus 1 is utilized.

In this example, in the case where the user watches a video by using the recording/reproducing unit 41, the following operation is conducted. A command for projecting the recording/reproducing unit 41 (open operation) is given from the remote control 50 attached to the image display apparatus 1. As a result, the drive current is fed to the motor 46 from the drive circuit 55 on the basis of a command of the control circuit 52. With this operation, when the motor 46 starts to rotate, the gear 47 fixed to its rotary shaft rotates, and the reduction gear 48 meshed with the gear 47 also rotates. In this example, because the reduction gear 48 is meshed with the rack gear 44 of the image display apparatus 1, when the reduction gear 48 starts to rotate, the movable right speaker 40 starts to move upward. Note that, when the rack presser 49 is apart from the position sensor 43b, the output of the position sensor 43b electrically changes over from an on-state to an off-state. In this way, when the movable right speaker 40 moves up to the rising end, the rack presser 49 comes substantially in close contact with the position sensor 43a. As a result, the output of the position sensor 43a electrically changes from the off-state to the on-state.

The control circuit 52 recognizes the on-state on the basis of a signal from the position sensor 43a and stops the energization to the motor 46, and stops the movement of the movable right speaker 40. Also, the control circuit 52 conducts the drive for the operation of projecting the recording/reproducing unit 41. Since the drive structure for conducting the transport drive can be realized in the same manner as that of the above-mentioned second embodiment, its detailed description and drawings will be omitted.

With the above structure, when the recording/reproducing unit 41 is apart from the position sensor 42a, the output of the position sensor 42a changes over from the on-state to the off-state. In this manner, the recording/reproducing unit 41 starts to move so as to project from the image display apparatus 1, and as shown in FIG. 10B, when the recording/reproducing unit 41 is moved to the position of the projection completion, the output of the position sensor 42b electrically changes over from the off-state to the on-state. The control circuit 52 detects a signal from the position sensor 42b and stops the energization to the movement motor (the motor 23 in the second embodiment) of the recording/reproducing unit 41, and stops the movement of the recording/reproducing unit 41.

With the above operation, the recording medium (not shown) of the recording/reproducing unit 41 can be loaded or exchanged.

Thereafter, the user loads the recording medium (not shown) into the recording/reproducing unit 41 from the front side of the image display apparatus 1, and gives a command for housing the recording/reproducing unit 41 (close operation) from the remote control 50 attached to the image display apparatus 1. With this command, the drive current is supplied to the motor 23 for movement of the recording/reproducing unit 41 under the control by the control circuit 52. The drive current is opposite in polarity to that in case of the projection command and also opposite in the rotating direction of the motor, and the recording/reproducing unit 41 starts to move leftward (housing direction). At this time, the output of the position sensor 42b electrically changes from the on-state to the off-state.

In this way, when the recording/reproducing unit 41 returns to the housing state shown in FIG. 10A, the output of the position sensor 42a electrically changes over from the off-state to the on-state, and the control circuit 52 which is electrically connected to the position sensor 42a recognizes the on-state and thereafter stops the energization to the motor 23 for movement of the recording/reproducing unit 41, to thereby complete the housing operation of the recording/reproducing unit 41. With this operation, the drive current is then fed to the motor 46 for movement of the movable right speaker 40. The drive current is opposite in polarity to that in case of the above-mentioned move-up command and the rotating direction of the motor 46 also becomes opposite, to thereby start to move downward the movable right speaker 40.

When the rack presser 49 is apart from the position sensor 43a, the output of the position sensor 43a electrically changes over from the on-state to the off-state. In this way, when the movable right speaker 40 moves down to the falling end shown in FIG. 10A, the rack presser 49 comes substantially in close contact with the position sensor 43b. As a result, the output of the position sensor 43b is shifted from the off-state to the on-state. The control circuit 52 which is electrically connected to the position sensor 43a recognizes the on-state and thereafter stops the energization to the motor 46 and stops the movement of the movable right speaker 40.

Thereafter, the user gives the recording/reproducing command and the image display command from the remote control 50 attached to the image display apparatus 1 so that he can enjoy video and audio.

In a flowchart showing the processing of the control circuit 52 in accordance with the third embodiment, the same processing is basically executed by only judging the encoder signal in accordance with the signals from the position sensors 42a, 42b, 43a and 43b instead of the detection of the position of the recording/reproducing unit on the basis of the encoder signal in the flowchart showing the processing in accordance with the above-mentioned second embodiment, thereby being capable of realizing the movement control of the recording/reproducing unit 41 and the speaker 40, and therefore the flowchart showing that processing will be omitted here.

As described above, according to the third embodiment, the recording/reproducing unit 41 is so structured as to project from the side portion of the image display apparatus 1. This is because various circumstances are taken into consideration in addition to the installing method in which the image display apparatus 1 is hung on the wall. Also, in the case where the image display apparatus 1 is located on a table by using a stand (not shown) or the like, a space distance between the bottom portion of the image display apparatus 1 and the upper surface of the table becomes slight. In this case, there is a possibility that the structure is complicated in order to project the recording/reproducing unit 41 from the bottom portion.

Also, in the case where the image display apparatus 1 is located on a higher pace of the wall, when the recording/reproducing unit 41 is projected from the ceiling portion, it becomes difficult for the user to load the recording medium (not shown) in the recording/reproducing unit 41.

For the above reasons, the third embodiment is so structured as to project the recording/reproducing unit 41 from the right side surface of the image display apparatus 1. It is needless to say that if the structure is symmetrically reversed, the recording/reproducing unit 41 can be projected from the left side surface.

Also, in this embodiment, the movable right speaker 40 is so structured that it also moves in order to project the recording/reproducing unit 41. The above-mentioned second embodiment develops the movable right speaker 20 horizontally whereas the third embodiment moves the movable right speaker 40 upward. This is because in the case where the user locates the image display apparatus in a normal home, it is presumed that the space is more likely to be limited in the horizontal direction rather than the vertical direction due to the general structure of a room.

Also, in the above-mentioned second embodiment, the housing position and the projection position of the recording/reproducing unit 22 are confirmed by using an encoder signal built in the motor. On the other hand, in the third embodiment, four position sensors in total are arranged at the housing position and the projection position of the movable right speaker 40 to control the energization to and the stop of the motor by the control circuit 52. This is because the recording/reproducing unit 41 and the movable right speaker 40 are prevented from colliding with each other.

As described above, the features of the third embodiments are as follows:

(1) With the use of an image display panel using electron-emitting devices for the image display unit 2, a thin-type image display apparatus can be structured and a space can be saved by setting the image display apparatus on a wall.

(2) Because the recording/reproducing unit 41 is located at a position that faces a rear side of the image display unit 2 of the image display apparatus 1, no space in which the recording/reproducing unit is located is required while maintaining the features of the thin-type image display apparatus. In addition, this embodiment is preferable from the viewpoint of the appearance because the cable that connects the image display apparatus 1 and the recording/reproducing unit is not exposed from the wall face.

(3) Because the recording/reproducing unit is perfectly housed in the interior of the image display apparatus 1, the recording/reproducing unit 41 is covered by the image display apparatus 1 and protected from the entrance of dusts and an impact to improve the reliability.

(4) Since the mechanism of the projecting/housing operation of the recording/reproducing unit 41 is combined with the motor and the gear that operate in accordance with a command from the electric circuit, because all of the open/close operation is realized by the attached remote control, the operability is excellent.

(5) Since the projection/housing operation of the recording/reproducing unit 41 is at the right side surface of the image display apparatus (or may be at the left side surface), regardless of whether the image display apparatus is located on a table by using a stand or hung on a wall at a higher place, the ease of loading the recording medium is improved.

(6) In addition, when the recording/reproducing unit 41 is projected, the prevention moving direction of the movable speaker is directed upward, to thereby improve the degree of freedom of location of the image display apparatus by the user.

(7) In addition, since the size of the speaker which becomes an obstruction caused by the projecting operation of the recording/reproducing unit 41 is set to a size identical with that of a fixed type, the sound quality is not deteriorated.

(Fourth Embodiment)

Figure 11:
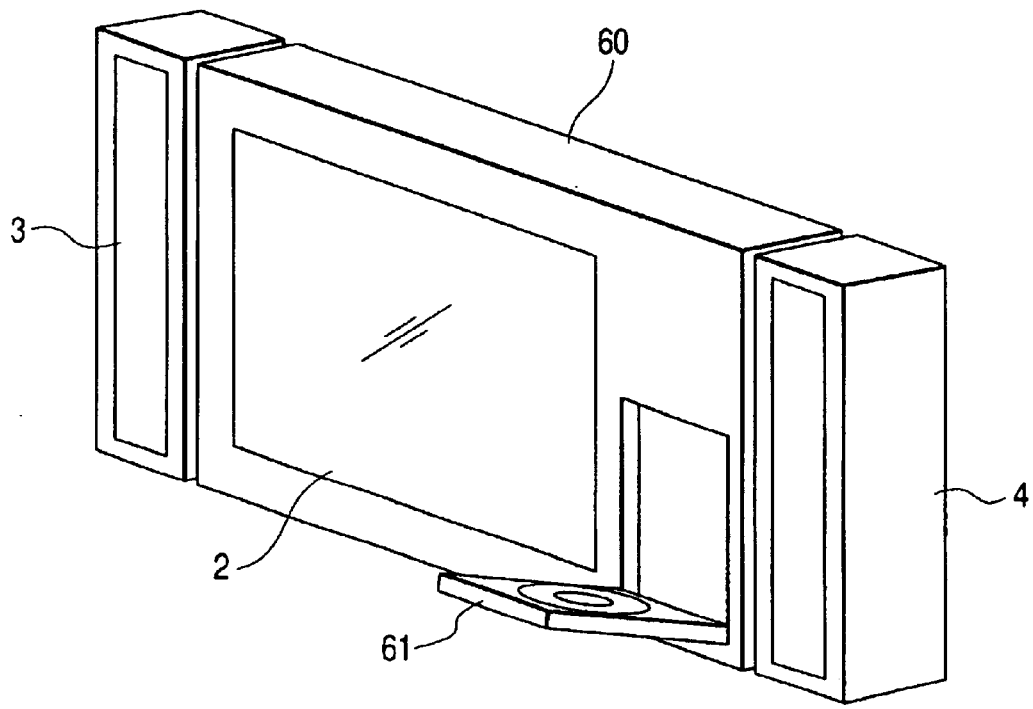
FIG. 11 is diagram showing the appearance of an image display apparatus in accordance with a fourth embodiment of the present invention.

FIG. 11 is a diagram showing the appearance of an image display apparatus 60 in accordance with a fourth embodiment of the present invention. Also, FIG. 12A is a longitudinal cross-sectional view showing the main portion when the recording/reproducing unit is housed, and FIG. 12B is a longitudinal cross-sectional view showing the main portion when the recording/reproducing unit is projected, in which the parts common to those in the above-mentioned first to third embodiments are designated by identical reference numerals.

Referring to FIG. 11, an image display apparatus 60 has an image display unit 2 built in and a recording/reproducing unit 61 built in at the right side of the image display unit 2. Also, the left speaker 3 and the right speaker 4 are provided at the left and right of the image display unit 2. The recording/reproducing unit 61 supplies a reproduced image signal and an audio signal to the image display apparatus 60, and in a normal use, the recording/reproducing unit 61 is housed in the interior of the image display apparatus 60 which cannot be viewed from the external.

Figure 12A:
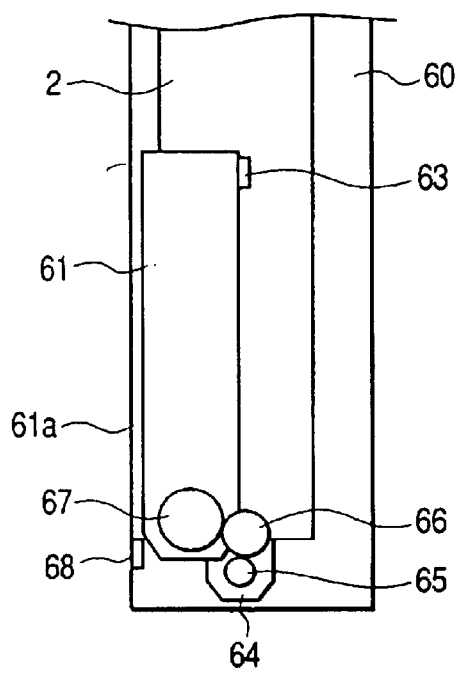
FIGS. 12A and 12B are longitudinal cross-sectional view showing the main portion of the image display apparatus in accordance with the fourth embodiment of the present invention.
Figure 12B:
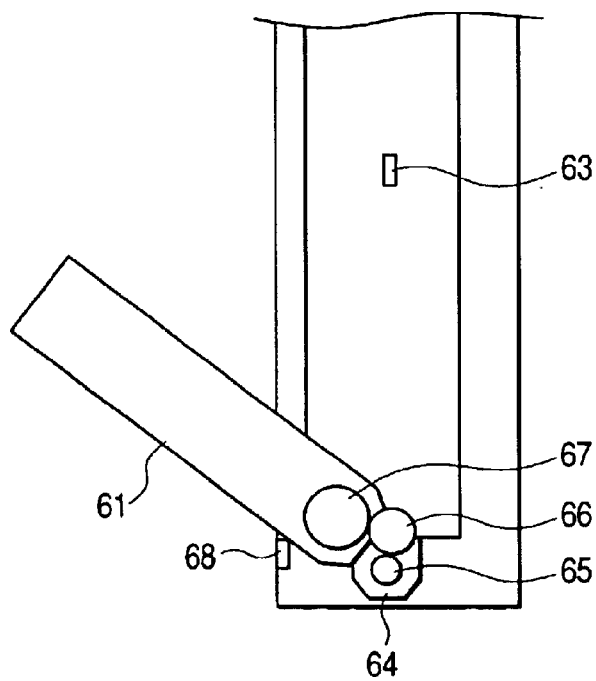

Referring to FIGS. 12A and 12B, reference numeral 61a denotes a cover, and when the recording/reproducing unit 61 is housed in the interior of the image display apparatus 60, the cover 61a makes the appearance integral with a cover that forms the appearance of the image display apparatus 60. Reference numeral 63 denotes an upper stopper which is fixed to the interior of the image display apparatus 60 and conducts the positioning in a state where the recording/reproducing unit 61 is housed. In this example, reference numerals 64 to 67 form a transport structure. Reference numeral 64 denotes a motor which is fixed to the interior of the image display apparatus 60, and as in the above-mentioned first embodiment, the motor is electrically connected to the drive circuit 55. Reference numeral 65 denotes a gear which is fixed to the rotary shaft of the motor 64. Reference numeral 66 denotes a reduction gear which is fixed to the interior of the image display apparatus 60 and meshed with the gear 65 to reduce the rotary speed. Reference numeral 67 denotes a rotary gear which is fixed to the side portion of the recording/reproducing unit 61 in the vicinity of the end portion thereof and meshed with the reduction gear 66. Reference numeral 68 denotes a lower stopper which is fixed to the interior of the image display apparatus 60 and determines the position of a state (refer to FIGS. 11 and 12B) where the recording/reproducing unit 61 is projected. Also, the electric circuit according to the fourth embodiment is identical with that in the above-mentioned first embodiment shown in FIG. 3, and therefore the duplex description will be omitted.

Subsequently, the operation of the above structure will be described.

In the image display apparatus 60 according to the fourth embodiment, in a normal state, the recording/reproducing unit 61 is housed (FIG. 12A). This is because a precise mechanism portion (not shown) and the image display unit 2 of the recording/reproducing unit 61 are protected from the entrance of dust and an impact by the cover of the image display apparatus 60 and the cover 61a of the recording/reproducing unit 61. Also, the reason why the recording/reproducing unit 61 is disposed at the right side of the image display unit 2 so as to be lined up with the image display screen is because the feature of the thin-type image display apparatus 60 is effectively utilized.

In this example, in the case where the user watches a video by using the recording/reproducing unit 61, the following operation is made.

A command for projecting the recording/reproducing unit 61 (open operation) is given from the remote control 60 attached to the image display apparatus 60. As a result, the drive current is fed to the motor 64 from the drive circuit 55 that is controlled by the control circuit 52. In this way, when the motor 64 starts to rotate, the gear 65 fixed to its rotary shaft rotates, and the reduction gear 66 meshed with the gear 65 also rotates. In addition, the rotary gear 67 that is meshed with the reduction gear 66 also starts to rotate. In this way, when the rotary gear 67 starts to rotate, the recording/reproducing unit 61 that fixes the rotary shaft of the rotary gear 67 to the side portion also rotates.

In this manner, the recording/reproducing unit 61 starts to project from the right side of the front surface of the image display apparatus 60. The movement speed is slow due to the drop of the reduction gear 66. When the recording/reproducing unit 61 moves to the position (the position of the projection completion) shown in FIG. 12B, the cover 61a of the recording/reproducing unit 61 is abutted against the lower stopper 68, to thereby limit the rotation of the recording/reproducing unit 61. In this situation, because the rotation of the motor 64 is restricted, a current value of the drive current that flows in the motor 64 increases. The drive circuit 55 is controlled in accordance with the current detection system of the control circuit 52 and the contents programmed in the control circuit 52 in advance to stop the drive current to the motor 64, thereby completing the projecting operation of the recording/reproducing unit 61.

Thereafter, the user loads the recording medium in the recording/reproducing unit 61 from the front side of the image display apparatus 60 and gives a command (close operation) of housing the recording/reproducing unit 61 from the remote control 50 attached to the image display apparatus 60. As a result, the drive current is fed to the motor 64 from the drive circuit 55. The drive current is opposite in polarity to that in case of the projection command and thus the rotating direction of the motor 64 also becomes opposite, to thereby move the recording/reproducing unit 61 toward the housing direction (the right rotation in the figure).

Returning to a state in which the recording/reproducing unit 61 is housed as shown in FIG. 12A, the upper end portion of the recording/reproducing unit 61 is abutted against the upper stopper 63, to thereby limit the rotation of the recording/reproducing unit 61. In this way, when the control circuit 52 stops the drive current to the motor 64 by the same means as that at the time of the above-mentioned projection, the motor 64 stops, thus completing the housing operation.

Thereafter, the user gives the recording/reproducing command and the image display command from the remote control 50 attached to the image display apparatus 60 to enjoy a video and an audio.

As described above, according to the fourth embodiment, the recording/reproducing unit 61 is disposed at a position where the recording/reproducing unit 61 is lined up with the image display screen, and it projects from the font portion of the image display apparatus 60. This is because the thickwise direction of the thin-type image display unit 2 and the thickwise direction of the recording/reproducing unit 61 are made uniform to minimize the thickness of the image display apparatus 60. It is needless to say that even if the image display apparatus 60 is hung on the wall or located on the table by using a stand, there will never be a case where it is difficult to load the recording medium 62 into the recording/reproducing unit 61. Also, according to the above structure, the same effect is obtained even if the recording/reproducing unit 61 is placed symmetrically reverse with respect to the image display unit 2.

As described above, the features according to the fourth embodiment are as follows.

(1) With the use of an image display panel using electron-emitting devices for the image display unit, a thin type image display apparatus can be structured, and a space can be saved by setting the image display apparatus on a wall.

(2) Because the built-in recording/reproducing unit 61 is arranged in the vicinity of the image display section 2 so that the thickness of the image display unit 2 and the thickness of the recording/reproducing unit 61 are made to face a uniform direction, no space in which the recording/reproducing unit 61 is located is required while maintaining the features of the thin-type image display apparatus.

In addition, this embodiment is also preferable from the viewpoint of the appearance because the cable that connects the image display apparatus 60 and the recording/reproducing unit 61 is not exposed from the wall face.

(3) Because the image display apparatus is covered integrally with the cover of the recording/reproducing unit 61 and the cover of the image display apparatus 60 when the recording/reproducing unit 61 is being housed, the recording/reproducing unit 61 and the image display unit 2 are protected from the entrance of dust and an impact to thereby improve the reliability.

(4) As a result of combining the mechanism of the projecting/housing operation of the recording/reproducing unit 61 with the motor and the gear that operate in accordance with a command from the electric circuit, because all of the open/close operation is realized by the attached remote control, the operability is excellent.

(5) Since the projection/housing operation of the recording/reproducing unit 61 can be performed at the front of the image display apparatus 60, regardless of whether the image display apparatus is located on a table by using a stand or hung on a wall at a higher place, the ease of loading the recording medium is improved.

The above-mentioned respective structures according to the respective embodiments may be implemented singly or appropriately in combination.

Also, in the above-described respective embodiments, the storage medium is projected for each of the recording/reproducing units, but it is also possible that the optical pickup of the recording/reproducing unit is always positioned within the casing, and only a holding structure such as the disc tray 70 may be projected or only the disc may be projected.

The present invention may be both applied to a system made up of a plurality of devices (for example, a host computer, an interface device, a reader, a printer, etc.), or to an apparatus made up of one device (for example, a copying machine, a facsimile machine, etc.).

Also, the object of the present invention is also achieved by supplying a storage medium (or a recording medium) in which a program code of software that realizes the function of the above-mentioned embodiment is recorded to a system or a device and executing the reading of the program code stored in the storage medium by a computer (or a CPU or an MPU) of the system or the device. In this case, the program code read from the storage medium itself realizes the functions of the above-mentioned embodiments, and the storage medium that stores the program code therein constitutes the present invention. Also, the functions of the above-mentioned embodiments are realized not only when the program code read by the computer is executed, but also when an operating system (OS) operating on the computer conducts a part or all of the actual processing on the basis of a command from the program code to thereby realize the functions of the above-mentioned embodiments by that processing.

In addition, after the program code read from the storage medium is written in a memory provided in a function extension card inserted into the computer or a function extension unit connected to the computer, the CPU or the like provided in the function extension card or the function extension unit may conduct a part or all of the actual processing on the basis of the command of the program code to thereby realize the functions of the above-mentioned embodiments by that processing.

As was described above, according to the present invention, the recording/reproducing unit can be housed within the device and used without losing the features of the thin-type image display apparatus such as a wall-hung TV.

Also, according to the present invention, the recording/reproducing unit can be housed within the device, which allows saving in space.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image display apparatus having a flat type image display panel and a casing that supports said image display panel, said image display apparatus comprising:
   a recording/reproducing unit that conducts writing or reading with respect to a plate-like storage medium; and
   a transport structure that supports said storage medium substantially in parallel with a panel face of said image display panel within said casing and projects said storage medium from said casing;
   wherein said transport structure changes an arrangement direction of said storage medium such that the arrangement direction of said storage medium supported within said casing and the arrangement direction of said storage medium projected from said casing are different.

2. An image display apparatus as claimed in claim 1, wherein said transport structure is of a structure in which a period of time during which the direction of said storage medium gradually changes occurs while said storage medium is shifted from a state where said storage medium is received in said casing to a state where said storage medium is most projected from said casing.

3. An image display apparatus having a flat type image display panel and a casing that supports said image display panel, said image display apparatus comprising:
   a recording/reproducing unit that conducts writing or reading with respect to a plate-like storage medium;
   a transport structure that supports said storage medium substantially in parallel with a panel face of said image display panel within said casing and projects said storage medium from said casing; and
   a moving structure for relatively moving a peripheral device attached to said casing with respect to said casing;
   wherein said moving structure can relatively move a peripheral device placed at a position where the peripheral device interferes with said storage medium when said storage medium is projected from said casing to a position where the peripheral device does not interfere when the storage medium is projected.

4. An image display apparatus as claimed in claim 3, wherein the peripheral device is a speaker.

5. An image display apparatus as claimed in claim 3, wherein said moving structure is of the structure in which the peripheral device and said casing can be relatively moved so as to be apart from each other.

6. An image display apparatus as claimed in claim 3, wherein said moving structure is of the structure in which a position of mounting the peripheral device to said casing is movable.

7. An image display apparatus having a flat type image display panel and a casing that supports said image display panel, said image display apparatus comprising:
   a recording/reproducing unit that conducts writing or reading with respect to a plate-like storage medium; and
   a transport structure that supports said storage medium substantially in parallel with a panel face of said image display panel within said casing and at a position where said storage medium is not superimposed on said image display panel, and projects said storage medium from said casing.

8. An image display apparatus as claimed in claim 7, wherein said transport structure is designed in such a manner that a holding structure for holding said recording/reproducing unit or said storage medium is drawn toward a front side while changing the direction of said storage medium, to thereby project said storage medium from said casing.

9. An image display apparatus as claimed in claim 1, wherein the plate-like storage medium comprises a disc like storage medium.

10. An image display apparatus as claimed in claim 3, wherein the plate-like storage medium comprises a disc like storage medium.

11. An image display apparatus as claimed in claim 7, wherein the plate-like storage medium comprises a disc like storage medium.

12. An image display apparatus as claimed in claim 1, wherein the projection of said storage medium is conducted by projecting it from said recording/reproducing unit and said casing.

13. An image display apparatus as claimed in claim 3, wherein the projection of said storage medium is conducted by projecting it from said recording/reproducing unit and said casing.

14. An image display apparatus as claimed in claim 7, wherein the projection of said storage medium is conducted by projecting it from said recording/reproducing unit and said casing.

15. An image display apparatus as claimed in claim 1, wherein the projection of said storage medium is conducted by projecting a holding structure for holding said storage medium from said casing.

16. An image display apparatus as claimed in claim 3, wherein the projection of said storage medium is conducted by projecting a holding structure for holding said storage medium from said casing.

17. An image display apparatus as claimed in claim 7, wherein the projection of said storage medium is conducted by projecting a holding structure for holding said storage medium from said casing.

18. An image display apparatus as claimed in claim 1, wherein said image display panel has a display screen of 30 inches or more in a diagonal line.

19. An image display apparatus as claimed in claim 3, wherein said image display panel has a display screen of 30 inches or more in a diagonal line.

20. An image display apparatus as claimed in claim 7, wherein said image display panel has a display screen of 30 inches or more in a diagonal line.

21. An image display apparatus as claimed in claim 1, wherein said image display panel is a display panel in which at least 100 electron-emitting devices are arranged.

22. An image display apparatus as claimed in claim 3, wherein said image display panel is a display panel in which at least 100 electron-emitting devices are arranged.

23. An image display apparatus as claimed in claim 7, wherein said image display panel is a display panel in which at least 100 electron-emitting devices are arranged.

24. An image display apparatus as claimed in claim 1, wherein said image display panel is a plasma display panel.

25. An image display apparatus as claimed in claim 3, wherein said image display panel is a plasma display panel.

26. An image display apparatus as claimed in claim 7, wherein said image display panel is a plasma display panel.

27. An image display apparatus as claimed in claim 1, wherein said image display panel is a liquid crystal panel.

28. An image display apparatus as claimed in claim 3, wherein said image display panel is a liquid crystal panel.

29. An image display apparatus as claimed in claim 7, wherein said image display panel is a liquid crystal panel.

* * * * *

UNITED STATES PATENT AND TRADEMARK OFFICE
CERTIFICATE OF CORRECTION

PATENT NO.    : 6,831,708 B2
DATED         : December 14, 2004
INVENTOR(S)   : Hisao Tajima It is certified that error appears in the above-identified patent and that said Letters Patent is hereby corrected as shown below:

Column 3,
Line 2, "dept (D2)" should read -- depth (D2) --.
Line 42, "handing" should read -- handling --.

Signed and Sealed this

Thirteenth Day of September, 2005

JON W. DUDAS
*Director of the United States Patent and Trademark Office*